(12) United States Patent
Kuramoto

(10) Patent No.: US 8,559,015 B2
(45) Date of Patent: Oct. 15, 2013

(54) MEASURING APPARATUS

(75) Inventor: Yoshiyuki Kuramoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 393 days.

(21) Appl. No.: 12/910,250

(22) Filed: Oct. 22, 2010

(65) Prior Publication Data
US 2011/0102805 A1   May 5, 2011

(30) Foreign Application Priority Data

Nov. 5, 2009   (JP) ................................. 2009-254452

(51) Int. Cl.
*G01B 9/02* (2006.01)
*G01N 21/41* (2006.01)
*G01N 21/43* (2006.01)

(52) U.S. Cl.
USPC ............................. 356/493; 356/487; 356/517

(58) Field of Classification Search
USPC .......... 356/486, 487, 485, 493, 492, 498, 517
See application file for complete search history.

(56) References Cited

U.S. PATENT DOCUMENTS

| | | | |
|---|---|---|---|
| 5,631,736 A * | 5/1997 | Thiel et al. ..................... | 356/486 |
| 6,122,058 A * | 9/2000 | Van Der Werf et al. ....... | 356/635 |
| 6,208,424 B1 * | 3/2001 | de Groot ......................... | 356/500 |
| 6,417,927 B2 * | 7/2002 | de Groot ......................... | 356/517 |
| 6,724,486 B1 * | 4/2004 | Shull et al. ..................... | 356/486 |
| 7,330,268 B2 * | 2/2008 | Pettipiece et al. ............. | 356/456 |
| 7,333,214 B2 * | 2/2008 | Sesko ............................. | 356/493 |
| 2007/0279637 A1 * | 12/2007 | Hill ................................. | 356/486 |

FOREIGN PATENT DOCUMENTS

| | | |
|---|---|---|
| JP | 2725434 B2 | 3/1998 |
| JP | 2810956 B2 | 10/1998 |

* cited by examiner

*Primary Examiner* — Gregory J Toatley
*Assistant Examiner* — Shawn Decenzo
(74) *Attorney, Agent, or Firm* — Rossi, Kimms & McDowell LLP

(57) ABSTRACT

The present invention provides a measuring apparatus for measuring an absolute distance between a reference surface and a test surface, including a phase detection unit configured to detect an interference signal between light reflected by the reference surface and light reflected by the test surface, and detect, from the interference signal, a phase corresponding to an optical path length between the reference surface and the test surface, and a processing unit configured to perform processing of obtaining the absolute distance by controlling the phase detection unit so as to detect the phase corresponding to the optical path length between the reference surface and the test surface for each of a first reference wavelength and a second reference wavelength while changing the wavelength of light to be emitted by a first light source continuously from the first reference wavelength to the second reference wavelength.

16 Claims, 10 Drawing Sheets

F I G. 1
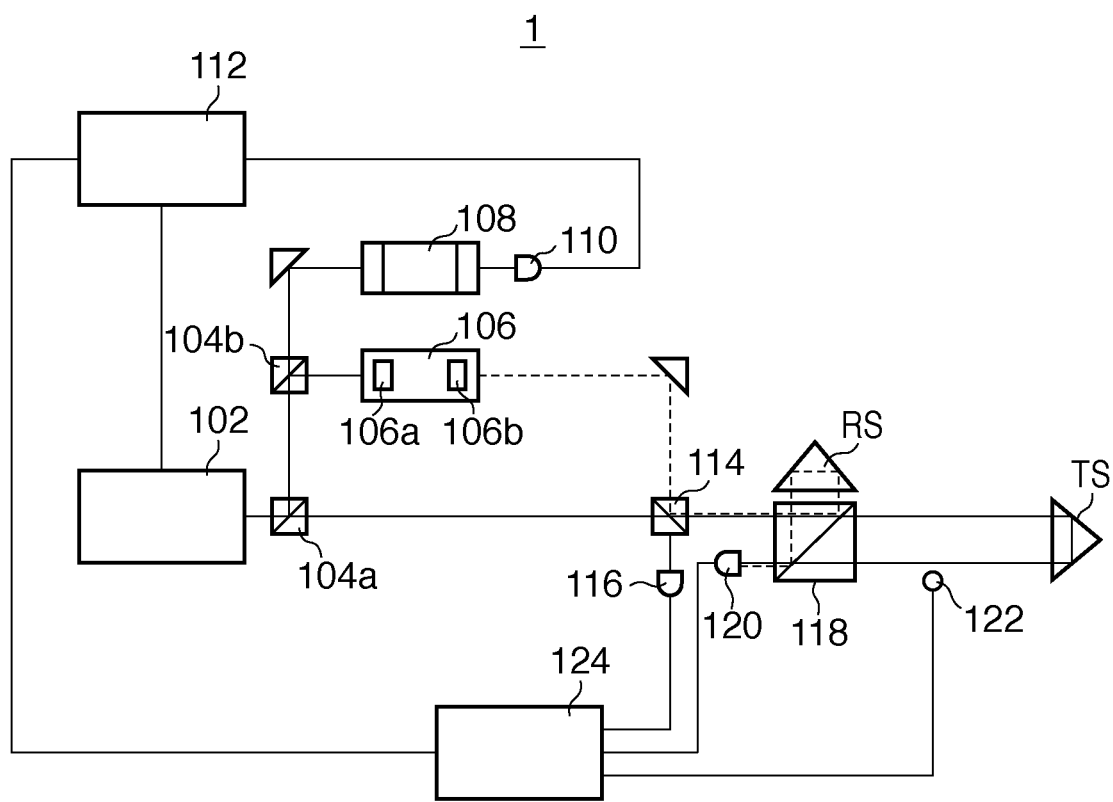

F I G. 10A
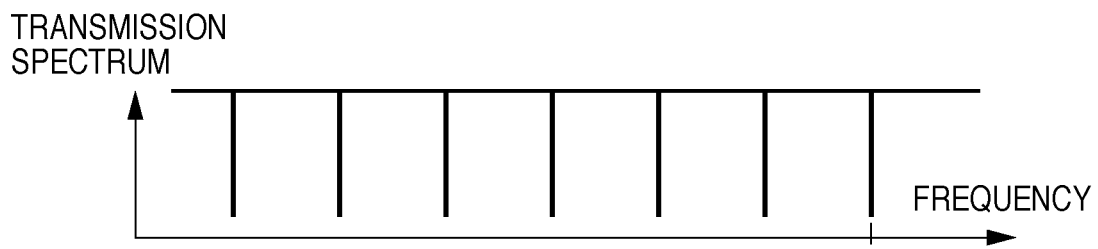
F I G. 10B
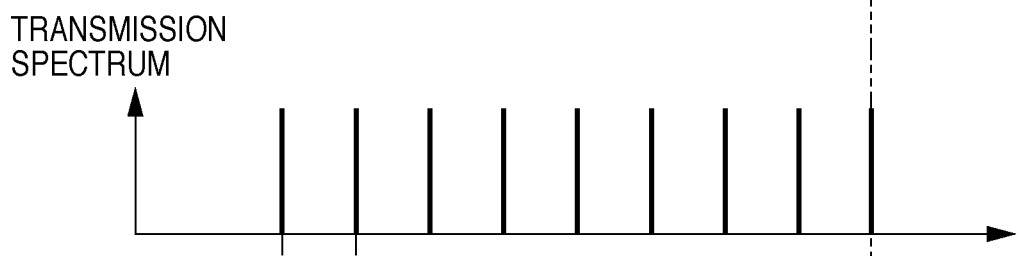
F I G. 10C
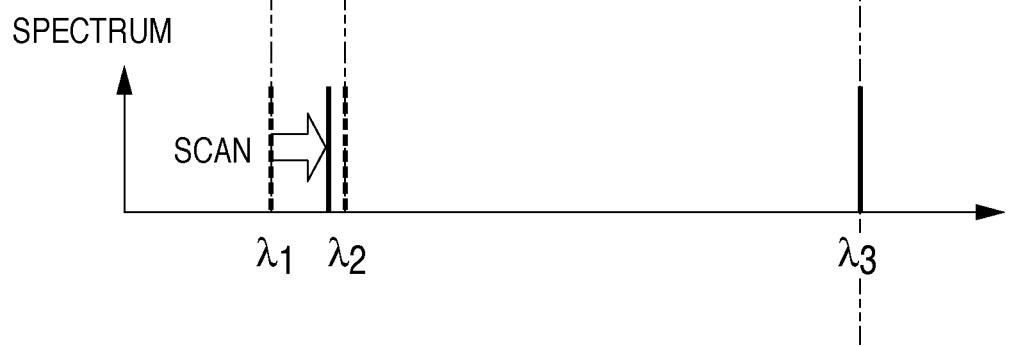

MEASURING APPARATUS

BACKGROUND OF THE INVENTION

1. Field of the Invention

The present invention relates to a measuring apparatus for measuring the absolute distance between a reference surface and a test surface.

2. Description of the Related Art

As an apparatus for measuring the absolute distance between a reference surface and a test surface, a wavelength scanning type light wave interference measuring apparatus is known. The accuracy of absolute distance measurement by wavelength scanning is generally low. For this reason, the measurement accuracy is improved by combining relative distance measurement using a fixed wavelength. Hence, the main accuracy factors of the wavelength scanning type light wave interference measuring apparatus are the accuracy of wavelength scanning (wavelength scanning amount), the accuracy of the fixed wavelength, and the measurement accuracy of a phase when measuring the relative distance.

FM heterodyne, an absolute distance measurement scheme using wavelength scanning, measures the intensity of a single interference signal, and calculates the absolute distance from a change in the intensity of the interference signal caused during wavelength scanning. For example, Japanese Patent No. 2725434 discloses a technique of guaranteeing the scanning amount of an atmospheric wavelength using a reference interferometer (that is, based on the length of the reference interferometer) and also guaranteeing a fixed wavelength using a wavelength reference such as an etalon or gas cell in FM heterodyne.

As a technique of measuring the absolute distance more accurately than FM heterodyne, Japanese Patent No. 2810956 discloses a technique of measuring a phase by obtaining a Lissajous' waveform from the intensities of two interference signals with a phase shift of 90°. In Japanese Patent No. 2810956, the scanning amount of an atmospheric wavelength is guaranteed by using a common reference interferometer for the wavelength scanning amount and the fixed wavelength. In addition, the fixed wavelength is controlled to make the atmospheric wavelength constant, thereby guaranteeing the variation in the refractive index of atmosphere.

However, because of a low phase measurement accuracy, the conventional light wave interference measuring apparatus cannot attain a sufficient measurement accuracy (that is, required measurement accuracy) even by combing relative distance measurement. Furthermore, when the phase measurement accuracy is low, the wavelength scanning amount needs to be larger to combine absolute distance measurement and relative distance measurement. This adds constraints on choice of a light source in the interferometer.

The techniques disclosed in Japanese Patent Nos. 2725434 and 2810956 need a reference interferometer. Hence, the arrangement of the light wave interference measuring apparatus becomes complex, and the measurement accuracy is reduced due to the variation in the length of the reference interferometer used as a reference.

SUMMARY OF THE INVENTION

The present invention provides a technique of accurately measuring the absolute distance between the reference surface and a test surface using a simple arrangement.

According to one aspect of the present invention, there is provided a measuring apparatus for measuring an absolute distance between a reference surface and a test surface, including a wavelength reference element configured to set a wavelength of light to be emitted by a first light source to one of a first reference wavelength that is a known vacuum wavelength and a second reference wavelength that is a known vacuum wavelength different from the first reference wavelength, a polarizing beam splitter configured to split the light from the first light source into light having a first polarization direction and light having a second polarization direction perpendicular to the first polarization direction, make the light having the first polarization direction enter the reference surface, and make the light having the second polarization direction enter the test surface, a refractive index detection unit configured to detect a group index in a space between the reference surface and the test surface, a phase detection unit configured to detect an interference signal between the light having the first polarization direction and reflected by the reference surface and the light having the second polarization direction and reflected by the test surface, and detect, from the interference signal, a phase corresponding to an optical path length between the reference surface and the test surface, and a processing unit configured to perform processing of obtaining the absolute distance by controlling the phase detection unit so as to detect the phase corresponding to the optical path length between the reference surface and the test surface for each of the first reference wavelength and the second reference wavelength while changing the wavelength of light to be emitted by the first light source continuously from the first reference wavelength to the second reference wavelength by using the wavelength reference element, wherein letting $\lambda_1$ be the first reference wavelength, $\lambda_2$ be the second reference wavelength, $\phi_1$ be the phase detected by the phase detection unit at the first reference wavelength, $\phi_2$ be the phase detected by the phase detection unit at the second reference wavelength, M be the number of phase jumps that occur when the wavelength of light to be emitted by the first light source is continuously changed from the first reference wavelength to the second reference wavelength, $\Lambda_{12}$ be a synthetic wavelength of the first reference wavelength and the second reference wavelength represented by $\lambda_1 \cdot \lambda_2 / |\lambda_1 - \lambda_2|$, $n_g$ be the group index detected by the refractive index detection unit, and k be the number of times the test surface reflects the light having the second polarization direction, the processing unit obtains the absolute distance $D_1$ by $$D_1 = \frac{1}{2k \cdot n_g}\left(M + \frac{\phi_2 - \phi_1}{2\pi}\right)\Lambda_{12}.$$

Further aspects of the present invention will become apparent from the following description of exemplary embodiments with reference to the attached drawings.

BRIEF DESCRIPTION OF THE DRAWINGS

FIG. 1 is a schematic view showing the arrangement of a measuring apparatus according to the first embodiment of the present invention.

FIGS. 10A to 10C are graphs showing the transmission spectrum of a gas cell, the transmission spectrum of a Fabry-Perot etalon, and the spectrum of light emitted by each of two light sources in the measuring apparatus shown in FIG. 9.

DESCRIPTION OF THE EMBODIMENTS

Figure 2:
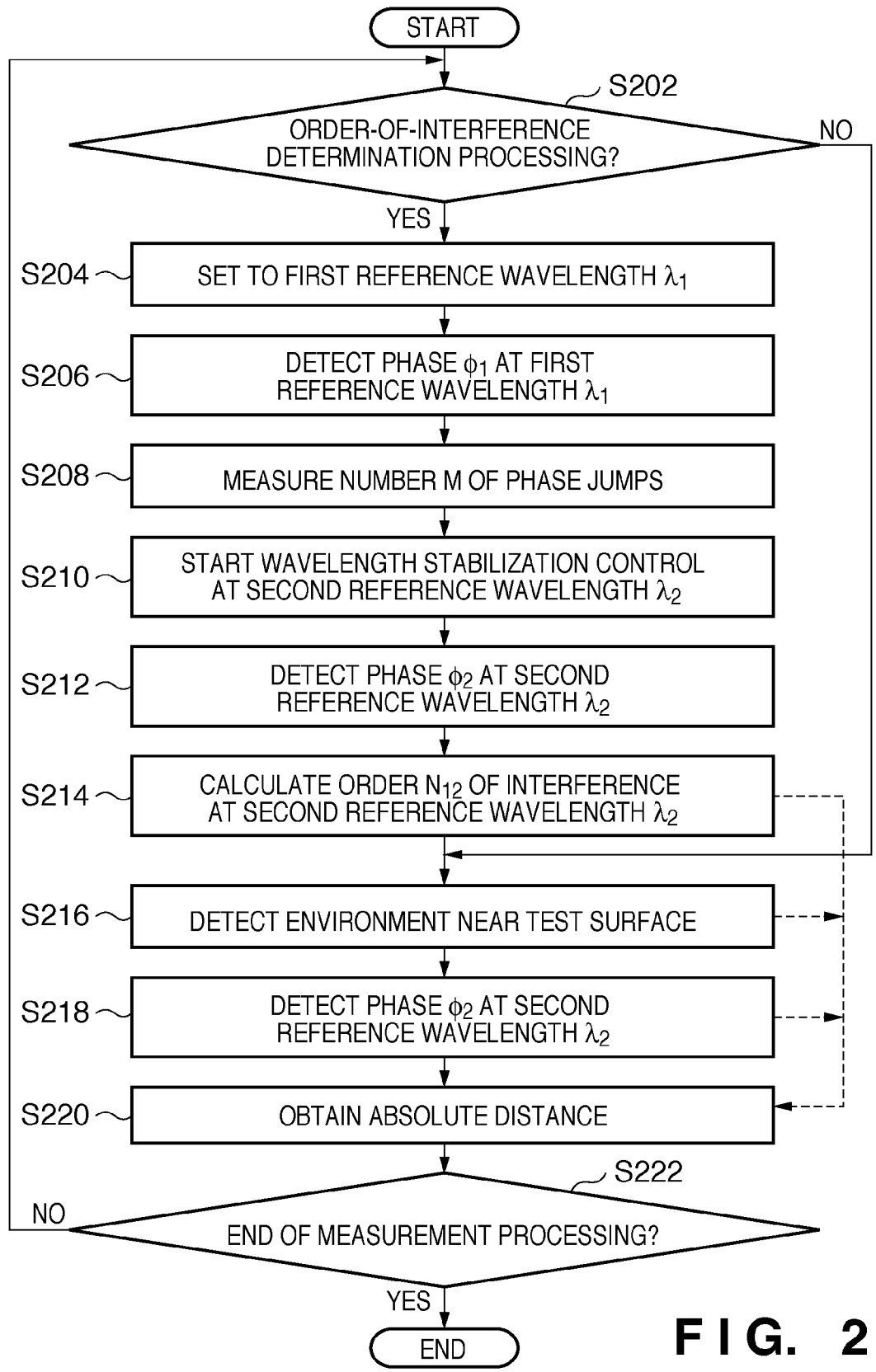
FIG. 2 is a flowchart for explaining measurement processing of the measuring apparatus shown in FIG. 1.

Preferred embodiments of the present invention will be described below with reference to the accompanying drawings. Note that the same reference numerals denote the same members throughout the drawings, and a repetitive description thereof will not be given.

<First Embodiment>

FIG. 1 is a schematic view showing the arrangement of a measuring apparatus 1 according to the first embodiment of the present invention. The measuring apparatus 1 is a light wave interference measuring apparatus for measuring the absolute distance between a reference surface and a test surface. As shown in FIG. 1, the measuring apparatus 1 includes a light source 102, beam splitters 104a and 104b, a wavelength shift unit 106, a Fabry-Perot etalon 108 serving as a wavelength reference element, and an intensity detection unit 110. The measuring apparatus 1 also includes a light source control unit 112, non-polarizing beam splitter 114, reference signal detection unit 116, polarizing beam splitter 118, measurement signal detection unit 120, environment detection unit 122, and processing unit 124.

As will be described later, the measuring apparatus 1 stabilizes a measurement wavelength (for example, vacuum wavelength) for a long term, and obtains the refractive index of a gas near the test surface, thereby accurately measuring the absolute distance between the reference surface and the test surface. In addition, the test surface and the reference surface reflect light components whose polarization directions are perpendicular to each other, thereby implementing phase detection by accurate heterodyne detection.

Light emitted, as linearly polarized light, by the light source 102 serving as a first light source is split (branched) into three light components via the two beam splitters 104a and 104b. The light source 102 is a wavelength variable light source capable of continuously changing the wavelength in the wavelength band (vacuum wavelength) to be used for the measurement. In this embodiment, an easily and inexpensively available DFB-DL (Distributed Feed-Back Diode Laser) mass-produced for optical communication is used as the light source 102. However, the light source 102 is not limited to the DFB-DL, and an external cavity diodelaser or fiber laser may also be used.

Out of the two light components split by the beam splitter 104a, the light component transmitted through the beam splitter 104a enters the non-polarizing beam splitter 114, and the light component reflected by the beam splitter 104a enters the beam splitter 104b. Out of the two light components split by the beam splitter 104b, the light component reflected by the beam splitter 104b enters the wavelength shift unit 106, and the light component transmitted through the beam splitter 104b enters the Fabry-Perot etalon 108.

In this embodiment, the wavelength shift unit 106 includes a shifter 106a formed from an acousto-optic device or the like, and a polarization rotation unit 106b formed from a wave plate or the like. The shifter 106a shifts the frequency (incident wavelength) of incident light by a known (predetermined) frequency dv. The polarization rotation unit 106b changes the polarization direction of light that has passed through the shifter 106a (more specifically, rotates the light by 90°), and exits a light component having a polarization direction perpendicular to that of the incident light. The light that has exited from the wavelength shift unit 106 enters the non-polarizing beam splitter 114.

The intensity detection unit 110 detects the intensity (etalon transmission intensity) of the light transmitted through the Fabry-Perot etalon 108. Based on the etalon transmission intensity detected by the intensity detection unit 110, the light source control unit 112 controls the wavelength of light to be emitted by the light source 102. For example, the light source control unit 112 modulates the temperature of the light source 102 or the current to be supplied to the light source 102, thereby controlling (adjusting) the wavelength of light to be emitted by the light source 102.

Note that for the transmission spectrum of the Fabry-Perot etalon 108, the absolute value of the vacuum wavelength needs to be guaranteed. In this embodiment, a vacuum medium etalon with a guaranteed transmission spectrum interval is used as the Fabry-Perot etalon 108. The vacuum medium etalon can easily guarantee the absolute value of the vacuum wavelength because there is neither the refractive index nor dispersion of the internal medium. If low thermal expansion glass or the like is used as the material of the etalon, the expansion coefficient for the temperature can be reduced so that a wavelength reference element that is stable for a long term can be implemented. However, the Fabry-Perot etalon 108 is not limited to the vacuum medium etalon, and an air gap etalon or solid etalon may be used. In this case, the internal refractive index and dispersion need to be guaranteed by, for example, measuring the temperature of the etalon. Alternatively, the etalon may be combined with a gas cell to obtain a more stable reference wavelength.

The light component transmitted through the beam splitter 104a and that transmitted through the wavelength shift unit 106 merge into a common optical path again at the non-polarizing beam splitter 114 which splits the light into two light components again. One of the light components split by the non-polarizing beam splitter 114 enters the reference signal detection unit 116.

The reference signal detection unit 116 detects, as the interference signal between the light transmitted through the beam splitter 104a and that transmitted through the wavelength shift unit 106, a beat signal corresponding to the frequency difference between the light components. The reference signal detection unit 116 includes a polarizer, and detects the interference signal by extracting a light component having a common polarization direction between the light transmitted through the beam splitter 104a and that transmitted through the wavelength shift unit 106. If the accuracy needs to be higher, the reference signal detection unit 116 may perform difference detection by generating an interference signal that is different by 180° by combining the polarizer with a wave plate. The interference signal generated by the reference signal detection unit 116 will be referred to as a reference signal hereinafter.

The other of the light components split by the non-polarizing beam splitter 114 enters the polarizing beam splitter 118. The polarizing beam splitter 118 has a function of splitting the light from the light source 102 into a light component having a first polarization direction and a light component having a second polarization direction perpendicular to the first polarization direction. In this embodiment, the polarizing beam splitter 118 passes the light component transmitted through the beam splitter 104a, and reflects the light component transmitted through the wavelength shift unit 106.

The light reflected by the polarizing beam splitter 118 is reflected by a reference surface RS. The light is reflected by the polarizing beam splitter 118 again, and enters the measurement signal detection unit 120. The reference surface RS is formed from a corner cube having a plurality of reflecting surfaces, and fixed to a reference structure serving as the reference of distance measurement together with the polarizing beam splitter 118. The light reflected by the reference surface RS will be referred to as reference light hereinafter.

The light transmitted through the polarizing beam splitter 118 is reflected by a test surface TS. The light passes through the polarizing beam splitter 118 again, and enters the measurement signal detection unit 120. The test surface TS is formed from a corner cube, like the reference surface RS, and fixed to the target object (test object) of distance measurement. The light reflected by the test surface TS will be referred to as test light hereinafter.

In this embodiment, the interferometer in the measuring apparatus 1 is designed such that the optical path difference between the reference light and the test light corresponds to one roundtrip (that is, the number of times the test surface TS reflects the test light is one). However, the interferometer may be designed in a different way. For example, the interferometer may be designed by inserting a λ/4 plate in each of the optical paths of the reference light and test light and arranging a corner cube configured to reflect one-roundtrip light so that the optical path difference between the reference light and the test light corresponds to two roundtrips.

The measurement signal detection unit 120 has the same arrangement as that of the reference signal detection unit 116, and detects the interference signal between the reference light and the test light. The interference signal detected by the measurement signal detection unit 120 will be referred to as a measurement signal hereinafter. The measurement signal is a beat signal corresponding to the frequency difference between the reference light and the test light, like the reference signal. However, the phase of the interference signal is different from that of the reference signal because of the optical path difference between the reference light and the test light.

The polarizing beam splitter 118 capable of splitting light in accordance with the polarization direction is used as a beam splitting element of the measuring apparatus 1 for measuring the absolute distance between the reference surface and the test surface. This allows a splitting of light reflected by each of the reference surface and the test surface in accordance with the polarization direction. Hence, a slight frequency shift difference is added between the two light components whose polarization directions are perpendicular to each other. This enables heterodyne detection to be performed between the reference surface and the test surface, and thus implement accurate phase detection.

The environment detection unit 122 is arranged near the test surface TS to measure the environment in the space near the test surface TS, and more specifically, between the reference surface RS and the test surface TS. In this embodiment, the environment detection unit 122 functions as a refractive index detection unit which detects the group index in the space (that is, atmosphere) between the reference surface RS and the test surface TS. The environment detection unit 122 includes, for example, a thermometer that detects the temperature of a gas in the space between the reference surface RS and the test surface TS, and a barometer that detects the atmospheric pressure in the space between the reference surface RS and the test surface TS. The temperature sensitivity and atmospheric pressure sensitivity of the refractive index of the atmosphere are 1 ppm/C.° and 0.3 ppm/hPa, respectively. Hence, even when the environment detection unit 122 is formed from relatively cheap thermometer and barometer, a refractive index for about 0.1 ppm can easily be guaranteed.

The processing unit 124 performs processing for obtaining the absolute distance between the reference surface RS and the test surface TS using the reference signal detected by the reference signal detection unit 116, the measurement signal detected by the measurement signal detection unit 120, and the refractive index detected by the environment detection unit 122. In addition, the processing unit 124 controls the wavelength of light to be emitted by the light source 102 via the light source control unit 112.

In the measuring apparatus 1 of this embodiment, one interferometer is arranged for one light source 102. However, a plurality of interferometers may be arranged for one light source 102. More specifically, light is split (branched) between the non-polarizing beam splitter 114 and the polarizing beam splitter 118, and an interferometer is arranged for each light component. In general, the refractive index (atmospheric refractive index) near the test optical path of each interferometer changes depending on the arrangement position of the interferometer. However, when the refractive index is detected for each interferometer, the refractive index can be corrected for each interferometer. In this arrangement, since one light source suffices for a plurality of measurement axes (interferometers), the measuring apparatus for measuring the absolute distance between the reference surface and the test surface can be implemented while suppressing cost.

Measurement processing (that is, processing of causing the processing unit 124 to obtain the absolute distance between the reference surface RS and the test surface TS) of the measuring apparatus 1 will be described with reference to FIG. 2. The measurement processing of the measuring apparatus 1 is divided into order-of-interference determination processing in steps S204 to S214 and relative distance measurement processing in steps S216 to S220.

In step S202, it is determined whether or not to execute order-of-interference determination processing. For example, immediately after the start of absolute distance measurement or when the past phase detection history is lost by, for example, shielding light from the light source 102 (that is, relative distance measurement processing cannot be maintained), order-of-interference determination processing needs to be executed. Note that whether or not to execute order-of-interference determination processing is automatically determined by the processing unit 124. Upon determining to execute order-of-interference determination processing, the process advances to step S204. If it is determined not to execute order-of-interference determination processing, the process advances to step S216.

Figure 3A:
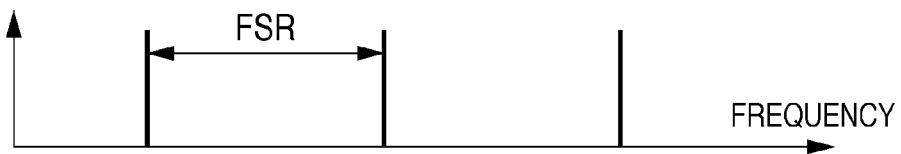
FIGS. 3A to 3C are views for explaining steps S204 and S208 of the flowchart shown in FIG. 2.
Figure 3B:
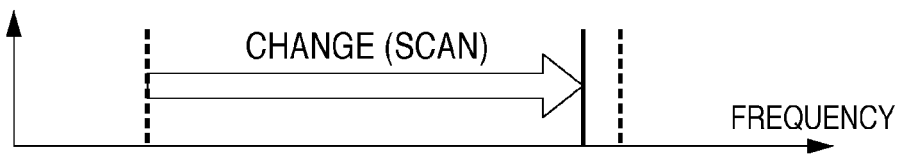

In step S204, the wavelength of light to be emitted by the light source 102 is set to a first reference wavelength $\lambda_1$ (that is, wavelength stabilization control at the first reference wavelength $\lambda_1$ starts). The first reference wavelength $\lambda_1$ will be explained with reference to FIGS. 3A and 3B. FIG. 3A shows the transmission spectrum of the Fabry-Perot etalon 108. FIG. 3B shows the spectrum of light emitted by the light source 102. As shown in FIG. 3A, the Fabry-Perot etalon 108 has a transmission characteristic periodical at a uniform frequency interval FSR, and the absolute value of the vacuum wavelength is guaranteed, as described above. As the first reference wavelength $\lambda_1$, one of the transmission spectra of the Fabry-Perot etalon 108 is used. In other words, the wavelength of light to be emitted by the light source 102 is stabilized with respect to the transmission spectrum of the Fabry-Perot etalon 108 corresponding to the first reference wavelength $\lambda_1$. Note that wavelength stabilization is performed by causing the light source control unit 112 (processing unit 124) to control the light source 102 such that the intensity detection unit 110 detects a predetermined etalon transmission intensity. Note that if there is influence of the variation in the incident light amount on the Fabry-Perot etalon 108, the incident light amount is detected, and correction is performed to make the incident light amount constant (that is, not to vary the incident light amount).

In step S206, a phase $\phi_1$ at the first reference wavelength $\lambda_1$ is detected. Detecting a phase means detecting the phase difference between the reference signal and the measurement signal. Hence, the processing unit 124 detects the phase of the reference signal and that of the measurement signal using a phase meter, and obtaining the difference between them, thereby obtaining the phase $\phi_1$ at the first reference wavelength $\lambda_1$. That is, the reference signal detection unit 116, measurement signal detection unit 120, and processing unit 124 function as a phase detection unit that detects, from the interference signals, a phase corresponding to the optical path length between the reference surface RS and test surface TS.

The phase at the first reference wavelength $\lambda_1$ will be explained here. Let $L_1$ be the optical path difference between the test light and the reference light from the light source 102 to the non-polarizing beam splitter 114, and $2n(\lambda)D$ be the optical path difference between the test light and the reference light from the non-polarizing beam splitter 114 to the measurement signal detection unit 120. Note that $n(\lambda)$ is the refractive index of the optical path of the test light, and D is the absolute distance between the reference surface RS and the test surface TS. In this case, a reference signal $I_{ref}$ and a measurement signal $I_{test}$ are given by $$\begin{cases} I_{ref} = I_0 \cos\left(2\pi\left(d\nu t + \frac{L_1}{\lambda_1}\right)\right) \\ I_{test} = I_0 \cos\left(2\pi\left(d\nu t + \frac{L_1}{\lambda_1} + \frac{2n(\lambda_1)D}{\lambda_1}\right)\right) \end{cases} \quad (1)$$

Referring to equations (1), the phase $\phi_1$ at the first reference wavelength $\lambda_1$ detected in step S206 is given by $$\phi_1 = 2\pi \cdot \text{mod}\left(\frac{2n(\lambda_1)D}{\lambda_1}, 1\right) \quad (2)$$

where mod(u,k) is the remainder of a first argument u for a second argument k.

In step S208, the number of phase jumps is measured while continuously changing (scanning) the wavelength of light to be emitted by the light source 102 from the first reference wavelength $\lambda_1$ to a second reference wavelength $\lambda_2$ (that is, canceling wavelength stabilization control at the first reference wavelength $\lambda_1$). Note that one of the transmission spectra of the Fabry-Perot etalon 108 is used as the second reference wavelength $\lambda_2$, like the first reference wavelength $\lambda_1$.

Figure 3C:
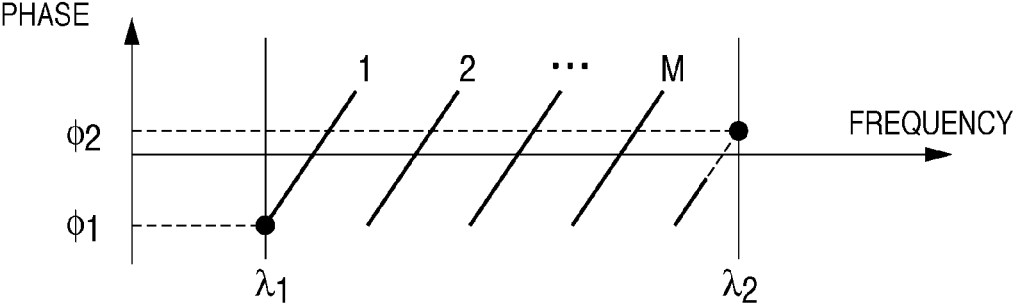

Note that step S208 can also be regarded as a process of measuring a cumulative phase generated by continuously changing the first reference wavelength $\lambda_1$ to the second reference wavelength $\lambda_2$. As the wavelength of light emitted by the light source 102 changes from the first reference wavelength $\lambda_1$ to the second reference wavelength $\lambda_2$ (FIG. 3B), the phase monotonously changes, as shown in FIG. 3C. Since the range of phases detectable by the phase meter is $\pm\pi$, phase jump occurs outside the range of $\pm\pi$. Measuring the cumulative phase corresponds to counting phase jumps. The number of phase jumps measured in step S208 will be represented by M hereinafter.

In step S210, when the wavelength of light to be emitted by the light source 102 has changed from the first reference wavelength $\lambda_1$ to the second reference wavelength $\lambda_2$, wavelength stabilization control at the second reference wavelength $\lambda_2$ starts. In other words, the wavelength of light to be emitted by the light source 102 is stabilized with respect to the transmission spectrum of the Fabry-Perot etalon 108 corresponding to the second reference wavelength $\lambda_2$.

In step S212, a phase $\phi_2$ at the second reference wavelength $\lambda_2$ is detected. The phase $\phi_2$ at the second reference wavelength $\lambda_2$ detected in step S212 is given by $$\phi_2 = 2\pi \cdot \text{mod}\left(\frac{2n(\lambda_2)D}{\lambda_2}, 1\right) \quad (3)$$

Referring to equations (2) and (3), the number M of phase jumps is given by $$\begin{cases} M = \frac{2n_g(\lambda_1, \lambda_2)D}{\Lambda_{12}} - (\phi_2 - \phi_1) \\ \Lambda_{12} = \frac{\lambda_1 \lambda_2}{|\lambda_1 - \lambda_2|} \end{cases} \quad (4)$$

where $\Lambda_{12}$ is the synthetic wavelength of the first reference wavelength $\lambda_1$ and the second reference wavelength $\lambda_2$ represented by $\lambda_1 \cdot \lambda_2/|\lambda_1 - \lambda_2|$. Note that as indicated by equations (4), the number M of phase jumps corresponds to the order of interference of the synthetic wavelength $\Lambda_{12}$, and will therefore be referred to as the order M of interference of the synthetic wavelength. In addition, $n_g(\lambda_1, \lambda_2)$ is the group index for the wavelengths $\lambda_1$ and $\lambda_2$.

In step S214, an order $N_{12}$ of interference (phase change amount) at the second reference wavelength $\lambda_2$ is calculated. First, using the synthetic wavelength $\Lambda_{12}$, a first absolute distance $D_1$ is obtained by $$D_1 = \frac{\Lambda_{12}}{2n_g(\lambda_1, \lambda_2)}\left(M + \frac{\phi_2 - \phi_1}{2\pi}\right) \quad (5)$$

In this embodiment, since the number k of times the test light is reflected by the test surface TS is one, k is omitted in equation (5). Note that $D_1 = \Lambda_{12}/\{2k \cdot n_g(\lambda_1,\lambda_2)\} \cdot (M + \{(\phi_2 - \phi_1)/2\pi\})$ in fact.

On the other hand, the absolute distance D can also be expressed using the second reference wavelength $\lambda_2$ by $$D = \frac{\lambda_2}{2n(\lambda_2)}\left(N_{12} + \frac{\phi_2}{2\pi}\right) \quad (6)$$

Since the second reference wavelength $\lambda_2$ is shorter than the synthetic wavelength $\Lambda_{12}$, the absolute distance D can accurately be obtained.

Using equation (5), the order $N_{12}$ of interference can be obtained by $$N_{12} = \text{round}\left(\frac{2n(\lambda_2)D_1}{\lambda_2} - \frac{\phi_2}{2\pi}\right) \quad (7)$$

$$= \text{round}\left(\left(M + \frac{\phi_2 - \phi_1}{2\pi}\right)\frac{n(\lambda_2)\Lambda_{12}}{n_g(\lambda_1,\lambda_2)\lambda_2} - \frac{\phi_2}{2\pi}\right)$$

where round( ) is the function for rounding an argument to an integer. Equation (7) includes a term representing the ratio of the refractive index to the group index, which is of an order of about $1+10^{-6}$, and can therefore be approximated to 1. However, if the ratio of the refractive index to the group index is not negligible (for example, the ratio of the synthetic wavelength $\Lambda_{12}$ to the second reference wavelength $\lambda_2$ is high), the environment in the space between the reference surface RS and the test surface TS is detected (S216) when detecting the phases in steps S206 and S212. This allows calculation of the ratio of the refractive index to the group index.

To determine (calculate) the order $N_{12}$ of interference without any error, the error of the argument of round( ) in equation (7) need only be smaller than ½. Let $d\phi$ be the phase detection error, $d\lambda_2$ be the error (error from the designed value) of the second reference wavelength $\lambda_2$, and $d\Lambda_2$ be the error (error from the designed value) of synthetic wavelength $\Lambda_{12}$. When $M \gg 1$, and $\Lambda_{12}/\lambda_2$, it is necessary to only satisfy $$\sqrt{2}\frac{d\phi}{2\pi}\frac{\Lambda_{12}}{\lambda_2} + \frac{2D}{\lambda_2}\frac{d\Lambda_{12}}{\Lambda_{12}} + \frac{2D}{\lambda_2}\frac{d\lambda_2}{\lambda_2} < \frac{1}{2} \quad (8)$$

In inequality (8), when the absolute distance D is 1.5 m, and the second reference wavelength $\lambda_2$ is 1.5 µm, $D/\lambda_2$ is $10^6$. On the other hand, $d\Lambda_{12}/\Lambda_{12}$ and $d\lambda_2/\lambda_2$ can implement $10^{-7}$ by using the Fabry-Perot etalon 108. Hence, the first term on the left-hand side is the constraint of equation (7). However, inequality (8) needs to hold for all absolute distances D, that is, a range Dmax of absolute distances measurable by the measuring apparatus 1.

The heterodyne method adopted by the measuring apparatus 1 of this embodiment can accurately detect a phase. Hence, a detection accuracy of about $10^{-4}$ [wave] can easily be obtained. If accurate phase detection can be implemented, the synthetic wavelength $\Lambda_{12}$ can be extended to $10^3$ times the second reference wavelength $\lambda_2$. When the second reference wavelength $\lambda_2$ is 1.5 µm, the synthetic wavelength $\Lambda_{12}$ can be extended up to 1.5 mm. Hence, the wavelength difference (wavelength change amount) between the first reference wavelength $\lambda_1$ and the second reference wavelength $\lambda_2$ is 1.5 nm. If the wavelength difference is as small as about 1.5 nm, wavelength change (wavelength scanning) can be done even using a DFB-DL. Hence, the measuring apparatus 1 can be implemented by a simple arrangement without using any complex light source such as an external cavity semiconductor laser.

In step S216, the environment in the space near the test surface TS, that is, between the reference surface RS and the test surface TS is detected. In this embodiment, the humidity in the space between the reference surface RS and the test surface TS is assumed to be guaranteed. The environment detection unit 122 detects a temperature t [° C.] and atmospheric pressure p [Pa] in the space, and inputs the detection result to the processing unit 124.

In step S218, the phase $\phi_2$ at the second reference wavelength $\lambda_2$ is detected, as in step S212. The phase $\phi_2$ corresponding to the optical path difference between the reference surface RS (reference light) and the test surface TS (test light) is thus obtained.

In step S220, the refractive index (atmospheric refractive index) in the space between the reference surface RS and the test surface TS is calculated, and the absolute distance D between the reference surface RS and the test surface TS is obtained. First, using the Edlen's formula based on the temperature t [° C.] and atmospheric pressure p [Pa], a refractive index (atmospheric refractive index) n of dry air is calculated by $$\begin{cases} n(\lambda) = 1 + \frac{p \cdot 10^{-8}}{96095.43}\left[8342.54 + \frac{2406147}{130 - S(\lambda)} + \frac{15998}{38.9 - S(\lambda)}\right] \\ \left[\frac{1 + 10^{-8}(0.601 - 0.00972t)p}{1 + 0.003661t}\right] \\ S(\lambda) = 1/(\lambda_2 \cdot 10^6)^2 \end{cases} \quad (9)$$

Note that the gas in the space between the reference surface RS and the test surface TS may be not a dry gas. In this case, the environment detection unit 122 needs to include a hygrometer for detecting the humidity of the gas. An Edlen's formula including a humidity correction term is used in place of equation (9).

Using the order $N_{12}$ of interference calculated in step S214, the phase $\phi_2$ detected in step S218, and the refractive index $n(\lambda_2)$, the absolute distance D can be obtained by equation (6). Especially when the absolute distance D is to be obtained first after executing the order-of-interference determination processing, the absolute distance D (absolute distance $D_2$) is obtained by $$D = \frac{\lambda_2}{2n(\lambda_2)}\left(\text{round}\left(\frac{2n(\lambda_2)D_1}{\lambda_2} - \frac{\phi_2}{2\pi}\right) + \frac{\phi_2}{2\pi}\right) \quad (10)$$

(see equations (5), (6), and (7)).

In step S222, it is determined whether or not to end the measurement processing (the processing of obtaining the absolute distance between the reference surface RS and the test surface TS). Upon determining to end the measurement processing, the measurement processing ends. If it is determined not to end the measurement processing, the process returns to step S202 to determine whether or not to execute order-of-interference determination processing. If it is determined not to execute order-of-interference determination processing, steps S216 to S220 are repeatedly executed. A change of the order of interference caused by movement of the test surface TS is corrected using a phase detection history. More specifically, letting $\phi_2(i)$ be the result of ith phase detection, and $\phi_2(i-1)$ be the result of (i-1)th phase detection, an order $N_{12}(i)$ of interference in obtaining the ith absolute distance is given by $$N_{12}(i) = N_{12}(i-1) + \text{round}\left(\frac{\phi_2(i-1) - \phi_2(i)}{2\pi}\right) \quad (11)$$

As described above, according to the measuring apparatus 1 of this embodiment, it is possible to accurately measure the absolute distance between the reference surface RS and the test surface TS using a simple arrangement.

<Second Embodiment>

Figure 4:
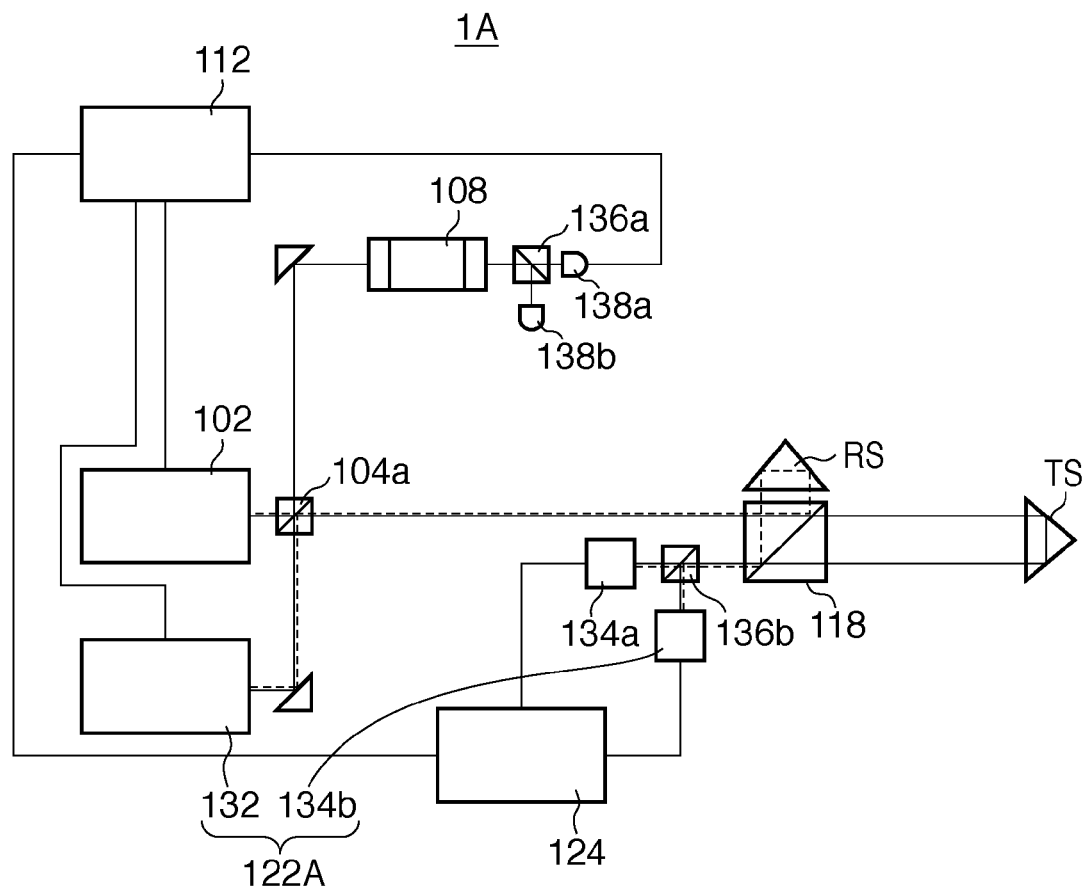
FIG. 4 is a schematic view showing the arrangement of a measuring apparatus according to the second embodiment of the present invention.

FIG. 4 is a schematic view showing the arrangement of a measuring apparatus 1A according to the second embodiment of the present invention. The measuring apparatus 1A basically has the same arrangement as that of the measuring apparatus 1. However, the measuring apparatus 1A includes, as an environment detection unit 122A for detecting the refractive index of a gas near a test surface TS, a light source 132 and a phase detection unit 134b which detects the optical path difference between a reference surface RS and the test surface TS using light emitted by the light source 132. The measuring apparatus 1A also includes a phase detection unit 134a, spectral elements 136a and 136b, and light amount detection units 138a and 138b.

The measuring apparatus 1A can detect the integrated value of refractive indices (atmospheric refractive indices) near the test surface TS by the two-color method. For this reason, even when the temperature distribution is large in the direction of measurement optical path, the effective refractive index (atmospheric refractive index) can accurately be obtained. Additionally, not a heterodyne scheme but a homodyne scheme is employed as the phase detection scheme, thereby implementing a more simple arrangement.

Light emitted by a light source 102 is split (branched) by a beam splitter 104a. Light emitted by the light source 132 serving as a third light source also enters the beam splitter 104a so as to have a ray axis coaxial with that of the light from the light source 102 (same optical path). The light is split by the beam splitter 104a. The light source 132 emits light having a wavelength different from that of the light from the light source 102. In this embodiment, a DFB-DL is used as the light source 132, like the light source 102.

One of the two light components split by the beam splitter 104a passes through a Fabry-Perot etalon 108, and is split by the spectral element 136a into the light from the light source 102 and that from the light source 132. As for the amount of light transmitted through the Fabry-Perot etalon 108, the light amount detection unit 138a detects the amount of the light from the light source 102, and the light amount detection unit 138b detects the amount of the light from the light source 132.

The light amounts detected by the light amount detection units 138a and 138b are input to a light source control unit 112. The light source control unit 112 independently controls the light sources 102 and 132 so that the wavelength of light emitted by the light source 102 and the wavelength of light emitted by the light source 132 stabilize with respect to different frequency components (reference wavelengths) of the transmission spectrum of the Fabry-Perot etalon 108. Note that in this embodiment, independent light sources are used as the light sources 102 and 132. However, the light source 102 may emit a double wave without using the light source 132. In this case, the wavelength of light to be emitted by the light source 132 need not be controlled. The double wave can easily be generated using a waveguide PPLN as a wavelength conversion element.

The other of the two light components split by the beam splitter 104a enters a polarizing beam splitter 118. The light reflected by the polarizing beam splitter 118 is reflected by the reference surface RS. The light is reflected by the polarizing beam splitter 118 again, and enters the spectral element 136b as reference light. The light transmitted through the polarizing beam splitter 118 is reflected by the test surface TS. The light passes through the polarizing beam splitter 118 again, and enters the spectral element 136b as test light.

The spectral element 136b is formed from, for example, a dichroic mirror to separate the light from the light source 102 and that from the light source 132 which are incident coaxially. However, the spectral element 136b is not limited to the dichroic mirror. A prism, bulk type diffraction grating, or array waveguide type diffraction grating is also usable, and the device can selected from the viewpoint of necessary wavelength resolution and cost.

The light from the light source 102 passes through the spectral element 136b, and enters the phase detection unit 134a. The phase detection unit 134a detects a phase (interference phase) corresponding to the optical path difference between the reference surface RS (reference light) and the test surface TS (test light) at the wavelength of light from the light source 102. On the other hand, the light from the light source 132 is reflected by the spectral element 136b, and enters the phase detection unit 134b. The phase detection unit 134b detects a phase (interference phase) corresponding to the optical path difference between the reference surface RS (reference light) and the test surface TS (test light) at the wavelength of light from the light source 132.

In this embodiment as well, the polarizing beam splitter 118 is used as a beam splitting element of the measuring apparatus 1A. This allows light reflected by each of the reference surface and the test surface to be split in accordance with the polarization direction. It is therefore possible to perform homodyne detection by phase difference control using the difference in polarization direction, and thus implement accurate phase detection.

Figure 5:
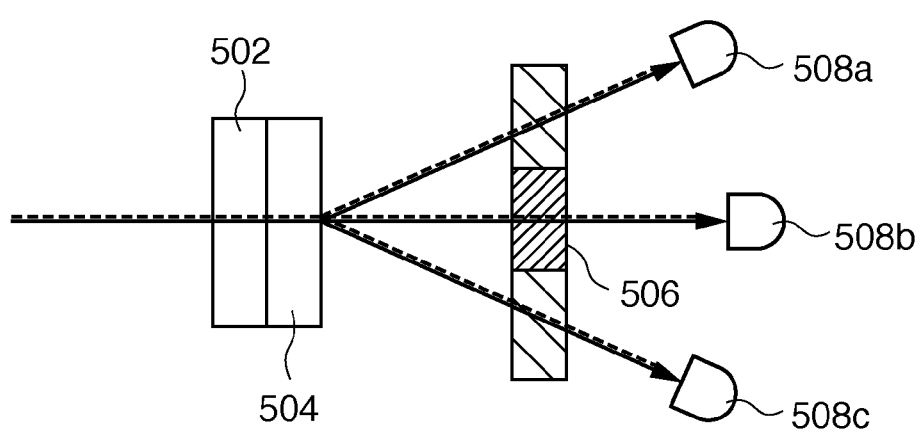
FIG. 5 is a view showing the detailed arrangement of a phase detection unit of the measuring apparatus shown in FIG. 4.

FIG. 5 is a view showing the detailed arrangement of the phase detection units 134a and 134b. Each of the phase detection units 134a and 134b includes a $\lambda/4$ plate 502 having a fast axis of 45° with respect to the angle of polarization axes of the test light and reference light, a grating beam splitter 504, a polarizer array 506, and a plurality of light amount detectors 508a, 508b, and 508c. The $\lambda/4$ plate 502 has a function of a phase difference adding unit which adds a plurality of known phase differences to incident light. In this embodiment, the $\lambda/4$ plate 502 converts the test light and reference light into right-handed circularly polarized light and left-handed circularly polarized light, respectively. The light transmitted through the $\lambda/4$ plate 502 is split into three light components, that is, 0th-order diffraction component and ±1st-order diffraction components in the same light amount by the grating beam splitter 504. The three light components pass through the polarizer array 506 which is arranged such that the light components pass in different polarization directions (polarizer angles), and are detected by the light amount detectors 508a, 508b, and 508c.

When the angle of each polarizer of the polarizer array 506 is set at a 120° pitch, light amounts Ia, Ib, and Ic detected by the light amount detectors 508a, 508b, and 508c, respectively, are given by $$I_a = I_0\{1 + V\cos(\phi)\}$$

$$I_b = I_0\{1 + V\cos(\phi + 2\pi/3)\} \quad (12)$$

$$I_c = I_0\{1 + V\cos(\phi + 4\pi/3)\}$$

where φ is the phase of the interference signal generated by the optical path difference between the reference surface RS (reference light) and the test surface TS (test light). Referring to equations (12), the phase φ can be obtained by $$\phi = \tan^{-1}\left(\frac{-\sqrt{3}(I_b - I_c)}{2I_a - I_b - I_c}\right) \quad (13)$$

The processing unit 124 obtains the phases from the detection results of the phase detection units 134a and 134b. More specifically, using equation (13), the processing unit 124 obtains the phase corresponding to the optical path difference between the reference surface RS and the test surface TS at the wavelength of light from the light source 102 and the phase corresponding to the optical path difference between the reference surface RS and the test surface TS at the wavelength of light from the light source 132.

In this embodiment, each of the phase detection units 134a and 134b detects the intensity of the interference signal for three known phase differences, as described above. Instead, the intensity of the interference signal for a plurality of known phase differences may be detected. The phase differences may spatially be added by generating tilt fringes between reference light and test light using a prism having birefringence. Note that the number of known phase differences or the interval between the known phase differences can be selected as needed in accordance with the necessary accuracy.

Note that since no high-frequency signals exist in homodyne detection, the detection system can be constituted less expensively than in heterodyne detection. As for the phase detection accuracy, an accuracy of about $10^{-4}$ [wave] can be implemented as in heterodyne detection by correcting the gains, offsets, and phase characteristics of the light amount detectors 508a, 508b, and 508c.

Figure 6:
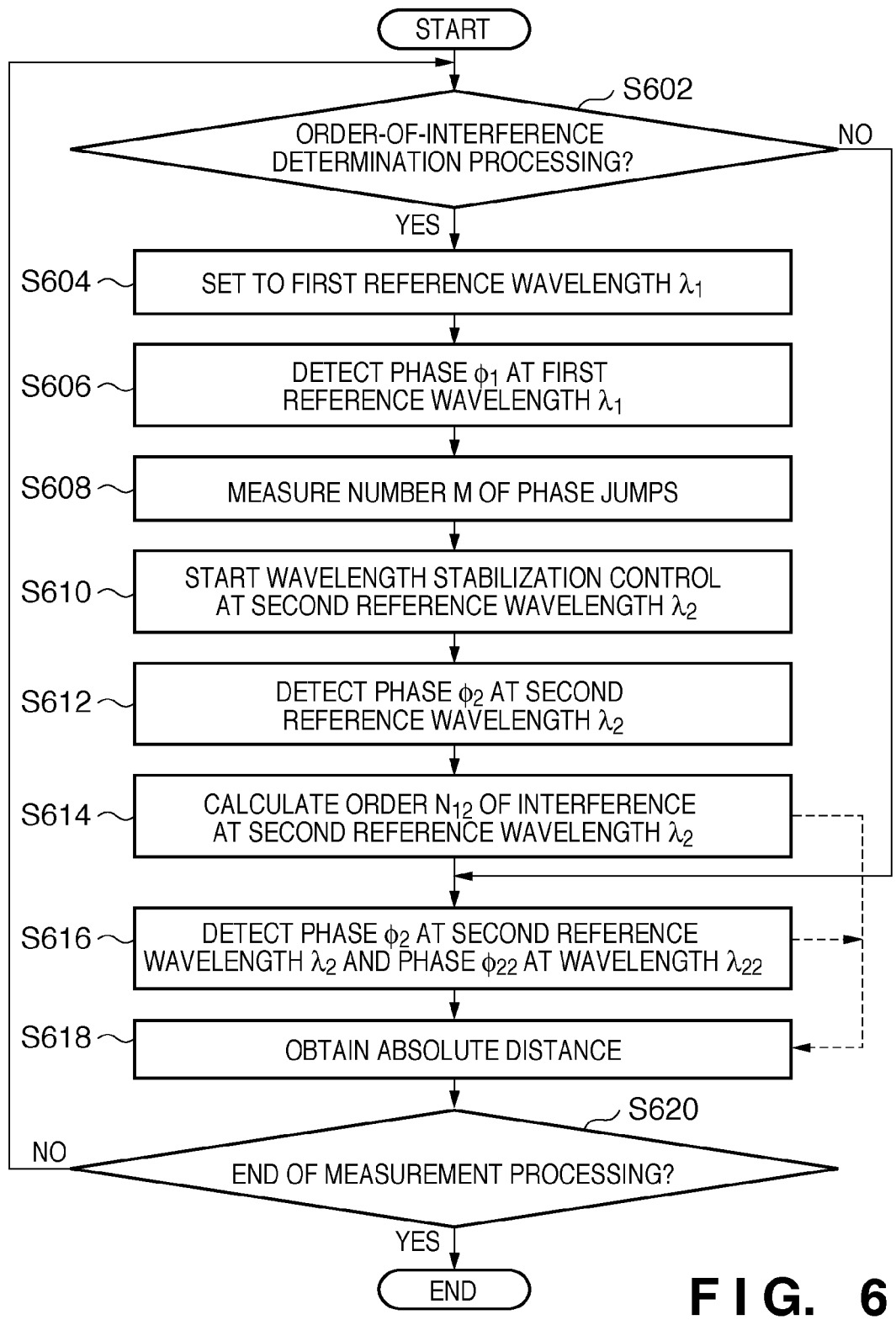
FIG. 6 is a flowchart for explaining measurement processing of the measuring apparatus shown in FIG. 4.

Measurement processing (that is, processing of causing the processing unit 124 to obtain the absolute distance between the reference surface RS and the test surface TS) of the measuring apparatus 1A will be described with reference to FIG. 6. Note that steps S602 to S614 of FIG. 6 are the same as steps S202 to S214 of FIG. 2, and a detailed description thereof will not be repeated here. An order $N_{12}$ of interference is assumed to be calculated (determined) in step S614.

In step S616, a phase $\phi_2$ at a second reference wavelength $\lambda_2$ and a phase $\phi_{22}$ at a wavelength $\lambda_{22}$ of light from the light source 132 are detected.

In step S618, an absolute distance D between the reference surface RS and the test surface TS is obtained. In this embodiment, the absolute distance D is obtained by correcting the refractive index of the gas in the space between the reference surface RS and the test surface TS using the dispersion of air at the two wavelengths. An optical path difference $OPD(\lambda_2)$ at the second reference wavelength $\lambda_2$ and an optical path difference $OPD(\lambda_{22})$ at the wavelength $\lambda_{22}$ are given by $$\begin{cases} OPD(\lambda_2) = 2n(\lambda_2)D = \lambda_2\left(N_{12} + \frac{\phi_2}{2\pi}\right) \\ OPD(\lambda_{22}) = 2n(\lambda_{22})D = \lambda_{22}\left(N_{22} + \frac{\phi_{22}}{2\pi}\right) \end{cases} \quad (14)$$

where $N_{22}$ is the order of interference at the wavelength $\lambda_{22}$.

A given by $$A = \frac{n(\lambda_2) - 1}{n(\lambda_2) - n(\lambda_{22})} \quad (15)$$

is called an A coefficient which is known to be constant independently of a variation in the temperature or atmospheric pressure of the dry gas. Hence, the A coefficient for the second reference wavelength $\lambda_2$ and the wavelength $\lambda_{22}$ can be obtained in advance.

From equations (14) and (15), we obtain $$\begin{cases} D = OPD(\lambda_2) - A \cdot (OPD(\lambda_2) - OPD(\lambda_{22})) \\ = \lambda_2\left(N_{12} + \frac{\phi_2}{2\pi}\right) - A \cdot \left[\lambda_2\left(N_{12} + \frac{\phi_2}{2\pi}\right) - \lambda_{22}\left(N_{22} + \frac{\phi_{22}}{2\pi}\right)\right] \\ N_{22} = \text{round}\left(\frac{n(\lambda_{22})}{n(\lambda_2)} \frac{OPD(\lambda_2)}{\lambda_{22}} - \frac{\phi_{22}}{2\pi}\right) \end{cases} \quad (16)$$

The absolute distance D can be obtained by equations (16) using the order $N_{12}$ of interference calculated in step S614, the phases $\phi_2$ and $\phi_{22}$ detected in step S616, and the A coefficient obtained in advance.

Referring to equations (16), to calculate the order $N_{22}$ of interference, the ratio of a refractive index $n(\lambda_2)$ at the second reference wavelength $\lambda_2$ to a refractive index $n(\lambda_{22})$ at the wavelength $\lambda_{22}$ is necessary. However, the ratio is of an order of about $1+10^{-5}$ under general conditions, and can therefore be approximated to 1. If the approximation is impossible, the wavelength of light to be emitted by the light source 132 is changed (scanned) to calculate (determine) the order $N_{22}$ of interference, as in steps S604 to S614.

If the gas in the space between the reference surface RS and the test surface TS is not a dry gas, the humidity in the space between the reference surface RS and the test surface TS is detected, and the A coefficient is updated in accordance with the humidity change, thereby obtaining the absolute distance D. Note that to detect the humidity in the space between the reference surface RS and the test surface TS, a hygrometer and a thermometer need to be arranged near the test surface TS.

In step S620, it is determined whether or not to end the measurement processing (the processing of obtaining the absolute distance between the reference surface RS and the test surface TS). Upon determining to end the measurement processing, the measurement processing ends. If it is determined not to end the measurement processing, the process returns to step S602 to determine whether or not to execute order-of-interference determination processing.

As described above, according to the measuring apparatus 1A of this embodiment, it is possible to accurately measure the absolute distance between the reference surface RS and the test surface TS using a simple arrangement while guaranteeing the variation in the refractive index of the gas in the space between the reference surface RS and the test surface TS.

<Third Embodiment>

Figure 7:
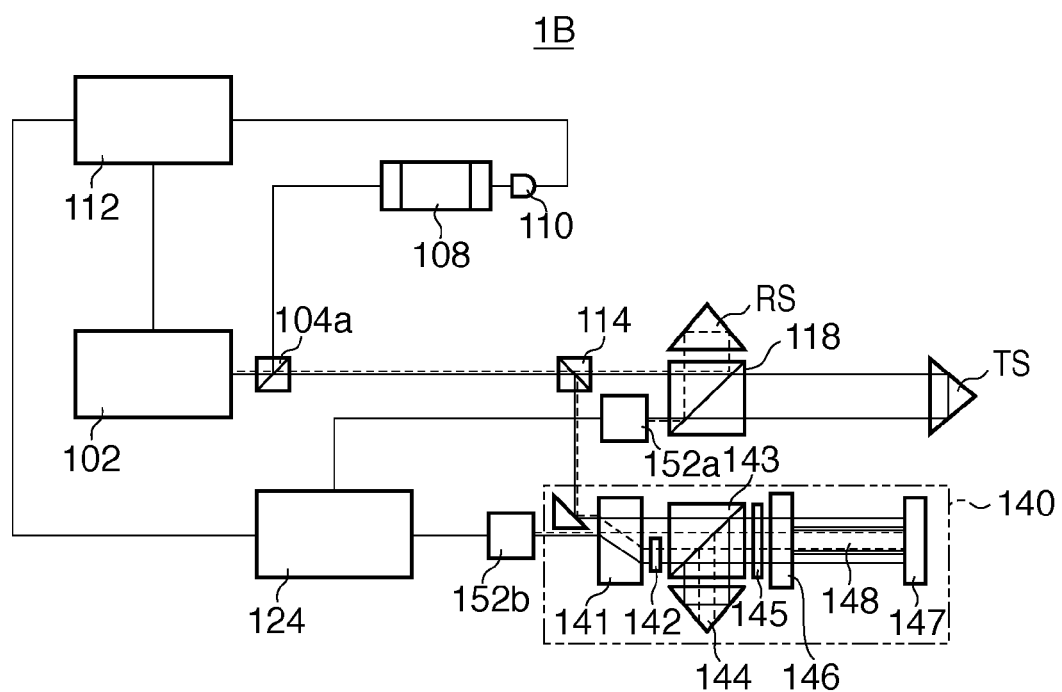
FIG. 7 is a schematic view showing the arrangement of a measuring apparatus according to the third embodiment of the present invention.

FIG. 7 is a schematic view showing the arrangement of a measuring apparatus 1B according to the third embodiment of the present invention. The measuring apparatus 1B basically has the same arrangement as that of the measuring apparatus 1 or 1A. However, the measuring apparatus 1B includes an interferometer 140 as an environment detection unit for detecting the refractive index of a gas near a test surface TS. The interferometer 140 detects an interference signal corresponding to the optical path difference between the vacuum reference optical path (first optical path) of a vacuum atmosphere having a known length and the atmospheric reference optical path (second optical path) of an atmosphere having the same length as that of the vacuum reference optical path. The measuring apparatus 1B also includes phase detection units 152a and 152b.

The measuring apparatus 1B can detect a refractive index using the interferometer 140 serving as an environment detection unit for detecting the refractive index (atmospheric refractive index) of the gas near the test surface TS without assuming a refractive index dispersion formula or the like. As for the influence of an error of the interferometer length, the interferometer for measuring the optical path difference between the vacuum reference optical path and the atmospheric reference optical path is constituted to reduce the error sensitivity and implement accurate refractive index detection.

Light emitted by a light source 102 is split (branched) by a beam splitter 104a. Out of the two light components split by the beam splitter 104a, a light component reflected by the beam splitter 104a passes through a Fabry-Perot etalon 108, and enters an intensity detection unit 110. Based on the etalon transmission intensity detected by the intensity detection unit 110, a light source control unit 112 controls the wavelength of light to be emitted by the light source 102 (that is, stabilizes the wavelength with respect to a transmission spectrum of the Fabry-Perot etalon 108).

A light component transmitted through the beam splitter 104a is split by a non-polarizing beam splitter 114. Out of the two light components split by the non-polarizing beam splitter 114, a light component transmitted through the non-polarizing beam splitter 114 enters a polarizing beam splitter 118. The light reflected by the polarizing beam splitter 118 is reflected by a reference surface RS. The light is reflected by the polarizing beam splitter 118 again, and enters the phase detection unit 152a as reference light. The light transmitted through the polarizing beam splitter 118 is reflected by the test surface TS. The light passes through the polarizing beam splitter 118 again, and enters the phase detection unit 152a as test light. The phase detection unit 152a has the same arrangement as that of the phase detection units 134a and 134b of the second embodiment, and detects a phase corresponding to the optical path difference between the reference surface RS (reference light) and the test surface TS (test light).

Out of the two light components split by the non-polarizing beam splitter 114, a light component reflected by the non-polarizing beam splitter 114 enters the interferometer 140. In the interferometer 140, an optical path difference is generated between a vacuum reference optical path through a vacuum medium between a first reference surface 146 and a second reference surface 147 and an atmospheric reference optical path through an atmospheric medium. Note that a phase corresponding to the optical path difference between the vacuum reference optical path and the atmospheric reference optical path is detected by the phase detection unit 152b.

The arrangement of the interferometer 140 will be described here. Light that enters the interferometer 140 is split by a beam displacer 141 in accordance with the polarization direction. Light that travels straight through the beam displacer 141 will be referred to as atmospheric reference light, and light horizontally displaced by the wake-off of the beam displacer 141 will be referred to as vacuum reference light hereinafter. The beam displacer 141 is formed from, for example, a uniaxial crystal such as YVO4. The beam displacer 141 may be formed by arranging a plurality of polarizing beam splitters.

The polarization direction of vacuum reference light transmitted through the beam displacer 141 is converted into the same polarization direction as that of the atmospheric reference light by a λ/2 plate 142. Then, the vacuum reference light enters a polarizing beam splitter 143. On the other hand, atmospheric reference light transmitted through the beam displacer 141 enters the polarizing beam splitter 143 without intervening the λ/2 plate 142. The vacuum reference light and atmospheric reference light pass through the polarizing beam splitter 143, are converted into circularly polarized light by a λ/4 plate 145, and pass through the first reference surface 146. A vacuum cell 148 is fixed between the first reference surface 146 and the second reference surface 147. The vacuum reference light propagates inside the vacuum cell 148. The atmospheric reference light propagates in the atmosphere. The vacuum reference light and atmospheric reference light are reflected by the second reference surface 147. After the polarization directions are converted by the λ/4 plate 145 into those perpendicular to the polarization directions in the forward path, the light components enter the polarizing beam splitter 143. The vacuum reference light and atmospheric reference light are reflected by the polarizing beam splitter 143, and enter a corner cube 144. The vacuum reference light and atmospheric reference light reflected by the corner cube 144 are reflected by the polarizing beam splitter 143 again so as to reciprocally travel between the polarizing beam splitter 143 and the second reference surface 147. The vacuum reference light and atmospheric reference light reciprocally traveled between the polarizing beam splitter 143 and the second reference surface 147 pass through the polarizing beam splitter 143. Only the atmospheric reference light enters the beam displacer 141 after its polarization direction is converted into a perpendicular direction by the λ/2 plate 142. In the beam displacer 141, wake-off occurs only in the atmospheric reference light. Hence, the vacuum reference light and atmospheric reference light are converted into coaxial light through the beam displacer 141, and enter the phase detection unit 152b. The vacuum reference light and atmospheric reference light have a common optical path length except for the optical path between the first reference surface 146 and the second reference surface 147. For this reason, the phase detection unit 152b detects an optical path difference corresponding to the medium difference (vacuum and atmosphere) between the first reference surface 146 and the second reference surface 147.

Figure 8:
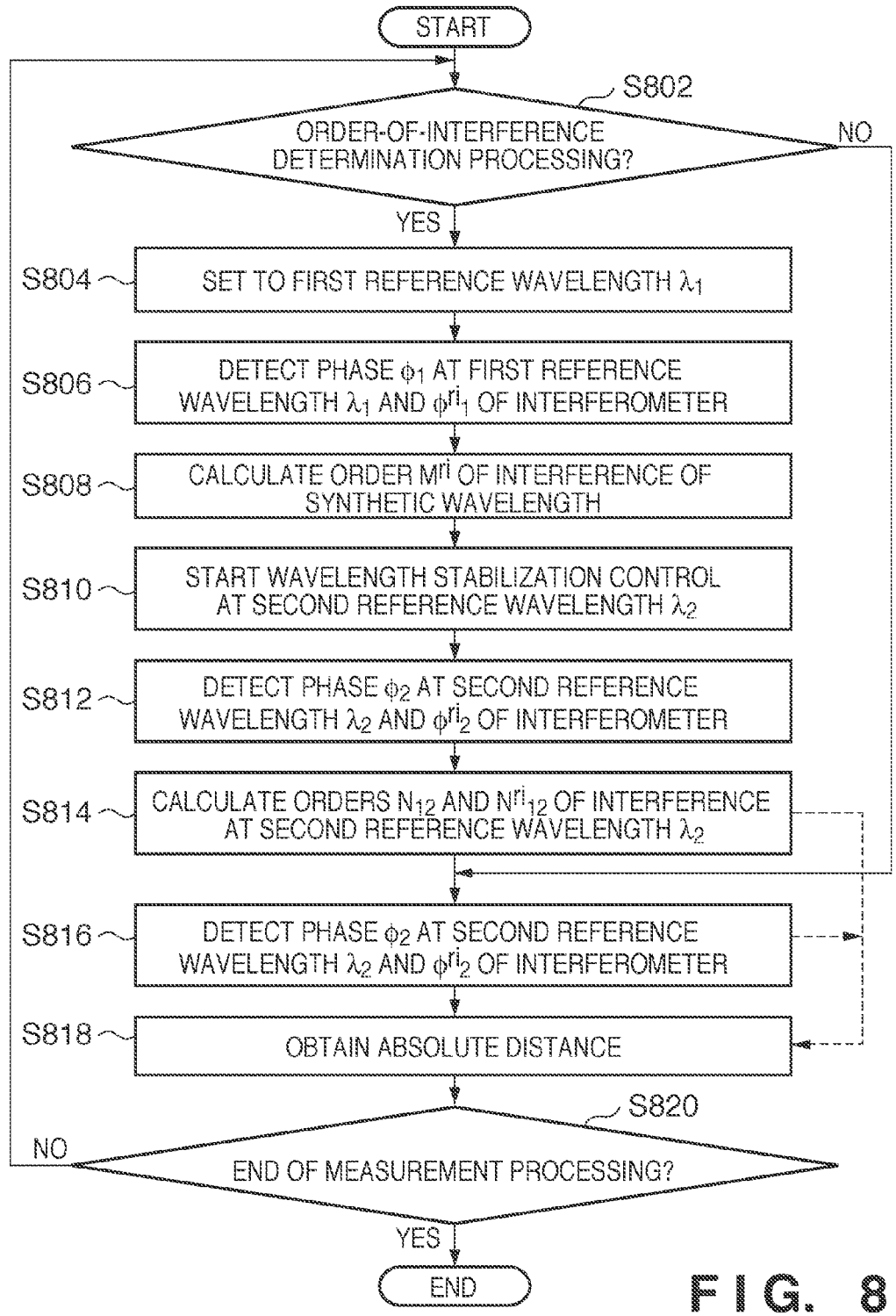
FIG. 8 is a flowchart for explaining measurement processing of the measuring apparatus shown in FIG. 7.

Measurement processing (that is, processing of causing the processing unit 124 to obtain the absolute distance between the reference surface RS and the test surface TS) of the measuring apparatus 1B will be described with reference to FIG. 8. Note that steps S802, S804, and S810 of FIG. 8 are the same as steps S202, S204, and S210 of FIG. 2, and a detailed description thereof will not be repeated here. In this embodiment, however, even when the phase detection history of the interferometer 140 is lost, order-of-interference determination processing needs to be executed. In steps S804 to S814, calculation of an order $N_{12}$ of interference is the same as in the first embodiment, and calculation of an order $N'^{7}_{12}$ of interference of the interferometer 140 is added.

In step S806, a phase $\phi_1$ at a first reference wavelength $\lambda_1$ and a phase $\phi'^{7}_1$ of the interferometer 140 are detected. Similarly, in step S812, a phase $\phi_2$ at a second reference wavelength $\lambda_2$ and a phase $\phi'^{7}_2$ of the interferometer 140 are detected. Letting $D'^{7}$ be the geometrical distance between the first reference surface 146 and the second reference surface 147, the phases $\phi''_1$ and $\phi''_2$ are given by $$\begin{cases} \phi_1^{ri} = 2\pi \operatorname{mod}\left(\frac{4(n(\lambda_1)-1)D^{ri}}{\lambda_1}, 1\right) \\ \phi_2^{ri} = 2\pi \operatorname{mod}\left(\frac{4(n(\lambda_2)-1)D^{ri}}{\lambda_2}, 1\right) \end{cases} \quad (17)$$

In step S808, an order $M^{ri}$ of interference of a synthetic wavelength $\Lambda_{12}$ is calculated while continuously changing (scanning) the wavelength of light to be emitted by the light source 102 from the first reference wavelength $\lambda_1$ to the second reference wavelength $\lambda_2$. The order $M^{ri}$ of interference is given by $$M^{ri} = \frac{4(n_g n_g(\lambda_1, \lambda_2)-1)D^{ri}}{\Lambda_{12}} - (\phi_2^{ri} - \phi_1^{ri}) \quad (18)$$

In step S814, the orders $N_{12}$ and $N^{ri}_{12}$ of interference at the second reference wavelength $\lambda_2$ are calculated. Based on equations (17) and (18), the order $N^{ri}_{12}$ of interference is given by $$\begin{aligned} N_{12}^{ri} &\equiv \operatorname{round}\left(\frac{4(n(\lambda_2)-1)D^{ri}}{\lambda_2} - \frac{\phi_2^{ri}}{2\pi}\right) \\ &= \operatorname{round}\left(\left(M^{ri} + \frac{\phi_2^{ri} - \phi_1^{ri}}{2\pi}\right)\frac{n(\lambda_2)\Lambda}{n_g(\lambda_1,\lambda_2)\lambda_2} - \frac{\phi_2^{ri}}{2\pi}\right) \end{aligned} \quad (19)$$

Calculating the order $N^{ri}_{12}$ of interference allows the optical path difference between the vacuum reference light to be determined and the atmospheric reference light without ambiguity of $2\pi$. Note that calculation of the order $N_{12}$ of interference is the same as in the first embodiment, and a detailed description thereof will not be repeated here.

In step S816, the phase $\phi_2$ at the second reference wavelength $\lambda_2$ and the phase $\phi''_2$ of the interferometer 140 are detected.

In step S818, the refractive index (atmospheric refractive index) in the space between the reference surface RS and the test surface TS is calculated, thereby obtaining the absolute distance D between the reference surface RS and the test surface TS. Using the order $N^{ri}_{12}$ of interference calculated in step S814 and the phase $\phi''_2$ detected in step S816, the refractive index n in the space between the reference surface RS and the test surface TS is calculated by $$n(\lambda_2) = \left(N_{12}^{ri} + \frac{\phi_2^{ri}}{2\pi}\right)\frac{\lambda_2}{4D^{ri}} + 1 \quad (20)$$

The geometrical distance $D^{ri}$ between the first reference surface 146 and the second reference surface 147 is assumed to be known. The first term on the right-hand side of equation (20) is the difference of the atmospheric refractive index from the vacuum refractive index, and is therefore about $3\times10^{-4}$ in general. Hence, the error of the atmospheric refractive index generated by an error $\Delta D^{ri}$ of the distance $D^{ri}$ is of an order of $3\times10^{-4}\times\Delta D_{ri}/D^{ri}$. This is more advantageous for the error of the same distance by only $3\times10^{-4}$ in terms of accuracy because the order of a reference interferometer including no vacuum reference optical path is $\Delta D_{ri}/D^{ri}$.

The absolute distance D can be obtained by equation (6) described above using the order $N_{12}$ of interference calculated in step S814, the phase $\phi_2$ detected in step S816, and equation (20).

In step S820, it is determined whether or not to end the measurement processing (the processing of obtaining the absolute distance between the reference surface RS and the test surface TS). Upon determining to end the measurement processing, the measurement processing ends. If it is determined not to end the measurement processing, the process returns to step S802 to determine whether or not to execute order-of-interference determination processing.

As described above, the measuring apparatus 1B of this embodiment has an arrangement with less influence of the distance error of the reference interferometer, and guarantees the variation in the refractive index of the gas in the space between the reference surface RS and the test surface TS. Hence, according to the measuring apparatus 1B of this embodiment, it is possible to accurately measure the absolute distance between the reference surface RS and the test surface TS using a simple arrangement.

<Fourth Embodiment>

Figure 9:
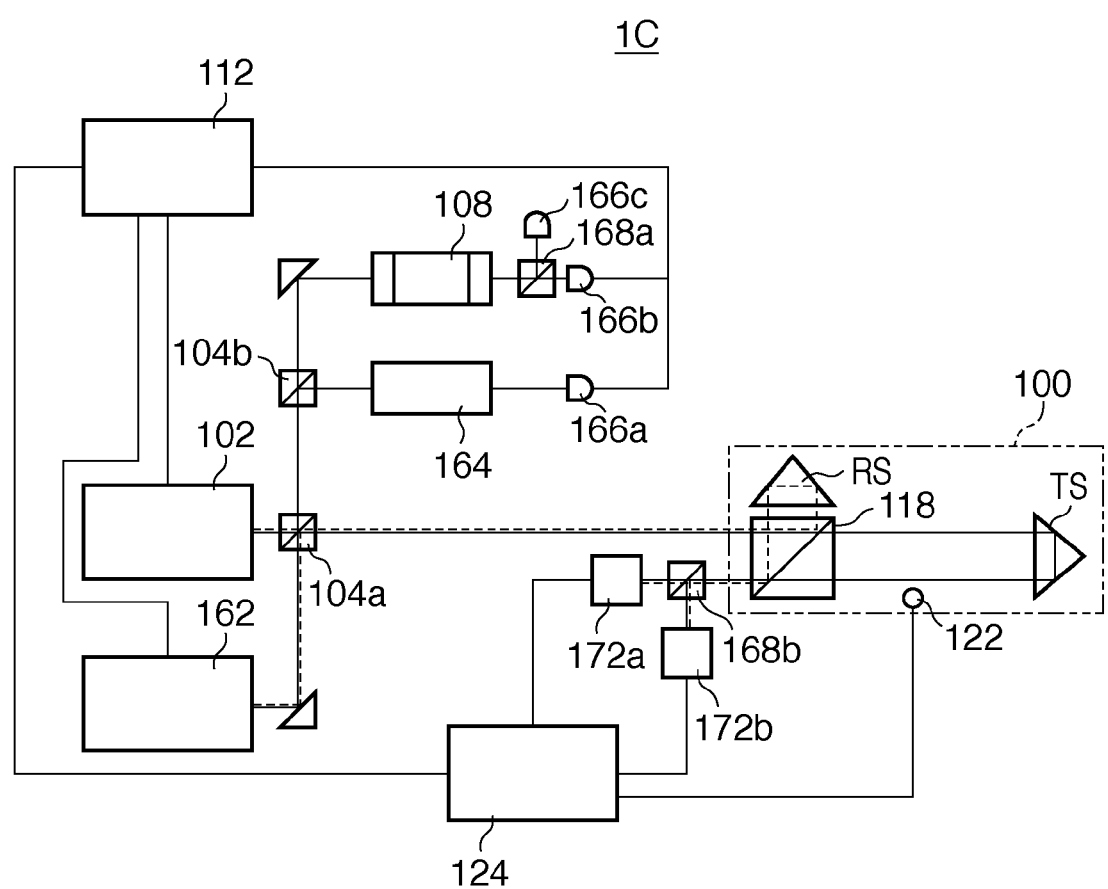
FIG. 9 is a schematic view showing the arrangement of a measuring apparatus according to the fourth embodiment of the present invention.

FIG. 9 is a schematic view showing the arrangement of a measuring apparatus 1C according to the fourth embodiment of the present invention. The measuring apparatus 1C basically has the same arrangement as that of the measuring apparatus 1, 1A, or 1B. However, the measuring apparatus 1C includes a light source 162, gas cell 164, light amount detection units 166a, 166b, and 166c, spectral elements 168a and 168b, and phase detection units 172a and 172b.

In the measuring apparatus 1C, the change amount of the wavelength of light from a light source 102 and the accuracy of wavelength change are reduced by using the synthetic wavelength of the wavelength of light emitted by the light source 102 and the wavelength of light emitted by the light source 162. In addition, when a plurality of interferometers are formed for a light source, stable measurement can always be performed using the light source 162. Hence, when changing the wavelength for determining the order of interference of an arbitrary measurement axis, an arrangement without any influence of wavelength change can be implemented for an interference axis (interferometer) which requires no order-of-interference determination.

Each of light emitted by the light source 102 and light emitted by the light source 162 is split (branched) by a beam splitter 104a. One light enters a Fabry-Perot etalon 108. The other light enters a polarizing beam splitter 118. The light emitted by the light source 162 serving as a second light source is also split by a beam splitter 104b, and enters the gas cell 164.

Note that in this embodiment, independent light sources are used as the light sources 102 and 162. However, the light sources may be formed by integrating a plurality of semiconductor lasers into one element, like a multi-wavelength light source used in optical communication. This is advantageous in terms of cost and apparatus dimensions.

The light amount detection unit 166a detects the amount of the light transmitted through the gas cell 164 (light from the light source 162). In this embodiment, as the wavelength of light emitted by the light source 102, a wavelength near 1.5 µm is used. As the filler gas of the gas cell 164, acetylene is used. However, the filler gas of the gas cell 164 is not limited to acetylene. It can be any other filler gas such as carbon monoxide or hydrogen cyanide usable in the wavelength band near 1.5 µm. One of the filler gases is selected as needed because they have different wavelength bands and center wavelength accuracies.

On the other hand, the light transmitted through the Fabry-Perot etalon 108 is split by the spectral element 168a into the light from the light source 102 and the light from the light source 162. As for the amount of light transmitted through the Fabry-Perot etalon 108, the light amount detection unit 166b detects the amount of the light from the light source 102, and the light amount detection unit 166c detects the amount of the light from the light source 162.

FIGS. 10A to 10C show the transmission spectrum of the gas cell 164, the transmission spectrum of the Fabry-Perot etalon 108, and the spectrum of light emitted by each of the light sources 102 and 162. Based on the light amount detected by the light amount detection unit 166a, a light source control unit 112 controls the light source 162 so that the wavelength of light to be emitted by the light source 162 stabilizes to a third reference wavelength $\lambda_3$ corresponding to the absorption line of the gas cell 164. Additionally, based on the light amount detected by the light amount detection unit 166c, the light source control unit 112 controls the optical path length of the Fabry-Perot etalon 108 so that the transmission spectrum of the Fabry-Perot etalon 108 matches the third reference wavelength $\lambda_3$. Note that the internal medium of the Fabry-Perot etalon 108 is vacuum, and the optical path length is controlled using the temperature of the etalon. Furthermore, based on the light amount detected by the light amount detection unit 166b, the light source control unit 112 controls the light source 102 so that the wavelength of light to be emitted by the light source 102 stabilizes to the transmission spectrum of the Fabry-Perot etalon 108. That is, the wavelength of light emitted by the light source 102 can stabilize to a first reference wavelength $\lambda_1$ or second reference wavelength $\lambda_2$, and can be changed (scanned) between the first reference wavelength $\lambda_1$ and the second reference wavelength $\lambda_2$.

In this embodiment, the Fabry-Perot etalon 108 is used in addition to the gas cell 164, thereby improving the accuracy of the reference wavelength. However, when the conditions to determine the order of interference to be described later are satisfied, the Fabry-Perot etalon 108 need not be used.

The light that enters the polarizing beam splitter 118 generates an interference signal corresponding to the optical path difference between a reference surface RS and a test surface TS at the wavelength of light from each light source (light source 102 or 162). The phase detection unit 172a detest a phase (interference phase) corresponding to the optical path difference between the reference surface RS and the test surface TS at the first reference wavelength $\lambda_1$ via the spectral element 168b. The phase detection unit 172b detest a phase (interference phase) corresponding to the optical path difference between the reference surface RS and the test surface TS at the third reference wavelength $\lambda_3$ via the spectral element 168b.

In this embodiment, the phase detection unit 172a for the light from the light source 102 and the phase detection unit 172b for the light from the light source 162 are independently formed, thereby simultaneously detecting the phase at the first reference wavelength $\lambda_1$ and that at the third reference wavelength $\lambda_3$. However, the light sources 102 and 162 may be switched using one phase detection unit. In this case, the measuring apparatus 1C can have a more simple arrangement.

Figure 11:
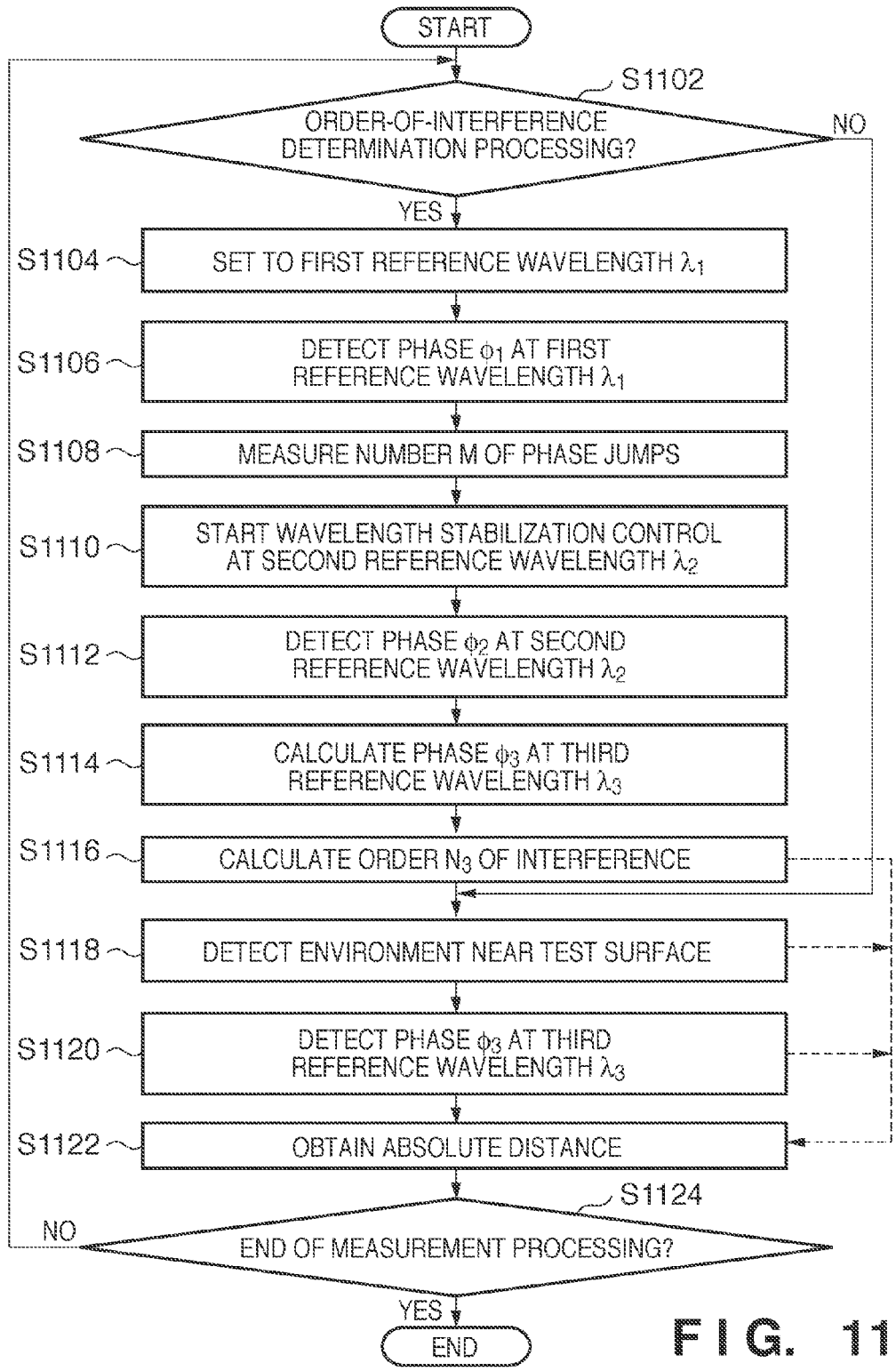
FIG. 11 is a flowchart for explaining measurement processing of the measuring apparatus shown in FIG. 9.

Measurement processing (that is, processing of causing a processing unit 124 to obtain the absolute distance between the reference surface RS and the test surface TS) of the measuring apparatus 1C will be described with reference to FIG. 11. Note that steps S1102 to S1112 of FIG. 11 are the same as steps S202 to S212 of FIG. 2, and a detailed description thereof will not be repeated here.

In step S1114, a phase $\phi_3$ at the third reference wavelength $\lambda_3$ is detected. The phase $\phi_3$ at the third reference wavelength $\lambda_3$ is given by $$\phi_3 = 2\pi \cdot \mathrm{mod}\left(\frac{2n(\lambda_3)D}{\lambda_3}, 1\right) \tag{21}$$

In step S1116, an order $N_3$ of interference at the third reference wavelength $\lambda_3$ is calculated. Let $\Lambda_{13}$ be the synthetic wavelength of the first reference wavelength $\lambda_1$ and the third reference wavelength $\lambda_3$ represented by $\lambda_1 \cdot \lambda_3 / |\lambda_1 - \lambda_3|$. In this case, the absolute distance D between the reference surface RS and the test surface TS, the third reference wavelength $\lambda_3$, and the synthetic wavelength $\Lambda_{13}$ have relations represented by $$D = \frac{\lambda_3}{2n(\lambda_3)}\left(N_3 + \frac{\phi_3}{2\pi}\right) \tag{22}$$

and $$D = \frac{\Lambda_{13}}{2n_g(\lambda_1, \lambda_2)}\left(M_{13} + \frac{\phi_3 - \phi_1}{2\pi}\right) \tag{23}$$

In equations (5), (22), and (23), the wavelength and the synthetic wavelengths have a relation $\lambda_3 \ll \Lambda_{13} \ll \Lambda_{12}$. Hence, the orders $N_3$ and $M_{13}$ of interference are given by $$\begin{cases} N_3 = \mathrm{round}\left(\left(M_{13} + \frac{\phi_3 - \phi_1}{2\pi}\right)\frac{n(\lambda_3)\Lambda_{13}}{n_g(\lambda_1, \lambda_3)\lambda_3} - \frac{\phi_3}{2\pi}\right) \\ M_{13} = \mathrm{round}\left(\left(M + \frac{\phi_2 - \phi_1}{2\pi}\right)\frac{n_g(\lambda_1, \lambda_3)\Lambda}{n_g(\lambda_1, \lambda_2)\Lambda_{13}} - \frac{\phi_3 - \phi_1}{2\pi}\right) \end{cases} \tag{24}$$

Let $d\phi$ be the phase detection error. Conditions to determine (calculate) the orders $N_3$ and $M_{13}$ of interference without any error are represented by $$\sqrt{2}\frac{d\phi}{2\pi}\frac{\Lambda_{13}}{\lambda_3} + \frac{2D}{\lambda_3}\frac{d\Lambda_{13}}{\Lambda_{13}} + \frac{2D}{\lambda_3}\frac{d\lambda_3}{\lambda_3} < \frac{1}{2} \tag{25}$$

$$\sqrt{2}\frac{d\phi}{2\pi}\frac{\Lambda}{\Lambda_{13}} + \frac{2D}{\Lambda_{13}}\frac{d\Lambda_{12}}{\Lambda_{12}} + \frac{2D}{\Lambda_{13}}\frac{d\Lambda_{13}}{\Lambda_{13}} < \frac{1}{2} \tag{26}$$

In inequality (25), when the absolute distance D is 1.5 m, and the third reference wavelength $\lambda_3$ is 1.5 μm, $D/\lambda_3$ is $10^6$. On the other hand, $d\Lambda_{13}/\Lambda_{13}$ and $d\lambda_3/\lambda_3$ can implement $10^{-7}$ by using the Fabry-Perot etalon 108 and the gas cell 164. Hence, the first term on the left-hand side is the constraint of equation (25). In addition, if $d\phi/2\pi$ is about $10^{-4}$ [wave], inequality (25) can be satisfied by selecting the first reference wavelength $\lambda_1$ such that $\Lambda_{13}$ becomes 1.5 mm.

Under the above-described conditions, $D/\Lambda_{13}$ is $10^3$ in inequality (26). Hence, for $d\Lambda_{12}/\Lambda_{12}$, the essential condition is about $10^{-4}$. Hence, the synthetic wavelength accuracy can be relaxed by two digits, as compared to the first embodiment. The maximum value of $\Lambda_{12}$ necessary under the above-described conditions is about 1.5 m. When this is converted into the wavelength difference (wavelength change amount) between the first reference wavelength $\lambda_1$ and the second reference wavelength $\lambda_2$, a very small value of 1.5 pm is obtained.

In this embodiment, to stabilize the first reference wavelength $\lambda_1$ and the second reference wavelength $\lambda_2$ to the transmission spectrum of the Fabry-Perot etalon 108, a frequency interval FSR of the Fabry-Perot etalon 108 needs to be smaller in accordance with the above-described wavelength change amount. If the above-described accuracy of $d\Lambda_{12}/\Lambda_{12}$ can be implemented without stabilizing the reference wavelengths to the transmission spectrum of the Fabry-Perot etalon 108, the second reference wavelength $\lambda_2$ need not be stabilized by the Fabry-Perot etalon 108. In this case, since the accuracy of the synthetic wavelength $\Lambda_{12}$ is guaranteed by current modulation or temperature modulation, wavelength change by the above-described minimum value of the wavelength change amount is implemented. Note that to implement large wavelength change by the DFB-DL, temperature modulation is necessary, and wavelength change takes a long time. However, when the wavelength change amount is decreased, as described above, high-speed wavelength change can advantageously be implemented by current modulation.

In step S1118, the environment in the space near the test surface TS, that is, between the reference surface RS and the test surface TS is detected, as in step S216.

In step S1120, the phase detection unit 172b detects the phase $\phi_3$ at the third reference wavelength $\lambda_3$.

In step S1122, the refractive index (atmospheric refractive index) in the space between the reference surface RS and the test surface TS is calculated, thereby obtaining the absolute distance D between the reference surface RS and the test surface TS. More specifically, the absolute distance D is obtained in accordance with equation (22) described above. However, especially when the absolute distance D is to be obtained after executing order-of-interference determination processing, the absolute distance D (absolute distance $D_3$) is obtained by $$D = \frac{\lambda_3}{2n(\lambda_3)} \left( \text{round}\left( \frac{n(\lambda_3)}{n_g(\lambda_1, \lambda_3)} \frac{\Lambda_{13}}{\lambda_3} \left( \text{round}\left( \frac{n_g(\lambda_1, \lambda_3)}{n_g(\lambda_1, \lambda_2)} \frac{2D_1}{\Lambda_{13}} - \frac{\phi_3 - \phi_1}{2\pi} \right) + \frac{\phi_3 - \phi_1}{2\pi} \right) - \frac{\phi_3}{2\pi} \right) + \frac{\phi_3}{2\pi} \right) \quad (27)$$

Step S1124 is the same as step S222, and a detailed description thereof will not be repeated here.

As described above, according to the measuring apparatus 1C of this embodiment, the wavelength change amount and wavelength change accuracy can be reduced. It is therefore possible to accurately measure the absolute distance between the reference surface RS and the test surface TS using a simple arrangement without requiring a reference interferometer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2009-254452 filed on Nov. 5, 2009, which is hereby incorporated by reference herein in its entirety.

What is claimed is:

1. A measuring apparatus for measuring an absolute distance between a reference surface and a test surface, the measuring apparatus comprising:
   a first light source;
   a wavelength reference element configured to set a wavelength of light to be emitted by the first light source to one of a first reference wavelength that is a known vacuum wavelength or a second reference wavelength that is a known vacuum wavelength different from the first reference wavelength;
   a polarizing beam splitter configured to split the light from the first light source into light having a first polarization direction and light having a second polarization direction perpendicular to the first polarization direction, make the light having the first polarization direction enter the reference surface, and make the light having the second polarization direction enter the test surface;
   a refractive index detection unit configured to detect a group index in a space between the reference surface and the test surface;
   a phase detection unit configured to detect an interference signal between the light having the first polarization direction and reflected by the reference surface and the light having the second polarization direction and reflected by the test surface, and detect, from the interference signal, a phase corresponding to an optical path length between the reference surface and the test surface; and
   a processing unit configured to perform processing of obtaining the absolute distance by controlling said phase detection unit so as to detect the phase corresponding to the optical path length between the reference surface and the test surface for each of the first reference wavelength and the second reference wavelength while changing the wavelength of light to be emitted by the first light source continuously from the first reference wavelength to the second reference wavelength by using said wavelength reference element,
   wherein letting $\lambda_1$ be the first reference wavelength, $\lambda_2$ be the second reference wavelength, $\phi_1$ be the phase detected by said phase detection unit at the first reference wavelength, $\phi_2$ be the phase detected by said phase detection unit at the second reference wavelength, M be the number of phase jumps that occur when the wavelength of light to be emitted by the first light source is continuously changed from the first reference wavelength to the second reference wavelength, $\Lambda_{12}$ be a synthetic wavelength of the first reference wavelength and the second reference wavelength represented by $\lambda_1 \cdot \lambda_2 / |\lambda_1 - \lambda_2|$, $n_g$ be the group index detected by said refractive index detection unit, and k be the number of times the test surface reflects the light having the second polarization direction, said processing unit obtains the absolute distance $D_1$ by:

$$D_1 = \frac{1}{2k \cdot n_g}\left(M + \frac{\phi_2 - \phi_1}{2\pi}\right)\Lambda_{12},$$

wherein letting $d\lambda_2$ be an error from a designed value of the second reference wavelength, $d\Lambda_{12}$ be an error from a designed value of the synthetic wavelength of the first reference wavelength and the second reference wavelength, $d\phi$ be a detection error of said phase detection unit, and $n_2$ be a refractive index at $\lambda_2$, a range Dmax of the absolute distance measurable by the measuring apparatus satisfies:

$$\sqrt{2}\frac{d\phi}{2\pi}\frac{\Lambda_{12}}{\lambda_2} + \frac{2k \cdot D_{max}}{\lambda_2}\frac{d\Lambda_{12}}{\Lambda_{12}} + \frac{2k \cdot D_{max}}{\lambda_2}\frac{d\lambda_2}{\lambda_2} < \frac{1}{2}, \text{ and}$$

said processing unit obtains the absolute distance $D_2$ by:

$$D_2 = \frac{\lambda_2}{2k \cdot n_2}\left(\text{round}\left(\frac{2k \cdot D_1}{\lambda_1} - \frac{\phi_1}{2\pi}\right) + \frac{\phi_1}{2\pi}\right).$$

2. The apparatus according to claim 1, further comprising:
a shifter configured to shift a frequency of the light having the first polarization direction and reflected by the reference surface; and
a change unit configured to change the polarization direction of the light having the first polarization direction and having passed through said shifter,
wherein said phase detection unit includes a light amount detector configured to detect the interference signal between the light having the first polarization direction and reflected by the reference surface and the light having the second polarization direction and reflected by the test surface.

3. The apparatus according to claim 1, wherein said phase detection unit includes:
a phase difference adding unit configured to add a plurality of known phase differences to each of the light having the first polarization direction and the light of the second polarization direction; and
a plurality of light amount detectors each configured to detect an interference signal for the plurality of known phase differences added by said phase difference adding unit.

4. The apparatus according to claim 1, wherein said wavelength reference element includes a Fabry-Perot etalon.

5. The apparatus according to claim 1, wherein said wavelength reference element includes a gas cell having an absorption line at the known vacuum wavelength.

6. The apparatus according to claim 1, wherein said refractive index detection unit includes:
a thermometer configured to detect a temperature in the space between the reference surface and the test surface; and
a hygrometer configured to detect an atmospheric pressure in the space between the reference surface and the test surface.

7. The apparatus according to claim 1, wherein said refractive index detection unit includes:
a third light source configured to emit light having a wavelength different from the wavelength of the light from the first light source; and
a detection unit configured to detect, using the light from said third light source, an optical path difference between the reference surface and the test surface in the same optical path as that of the light from the first light source.

8. The apparatus according to claim 1, wherein said refractive index detection unit includes a detection unit configured to detect an interference signal corresponding to an optical path difference between a first optical path of vacuum atmosphere having a known length and a second optical path of atmosphere having the same length as that of the first optical path.

9. A measuring apparatus for measuring an absolute distance between a reference surface and a test surface the measuring apparatus comprising:
a first light source;
a wavelength reference element configured to set a wavelength of light to be emitted by the first light source to one of a first reference wavelength that is a known vacuum wavelength or a second reference wavelength that is a known vacuum wavelength different from the first reference wavelength;
a polarizing beam splitter configured to split the light from the first light source into light having a first polarization direction and light having a second polarization direction perpendicular to the first polarization direction, make the light having the first polarization direction enter the reference surface, and make the light having the second polarization direction enter the test surface;
a refractive index detection unit configured to detect a group index in a space between the reference surface and the test surface;
a phase detection unit configured to detect an interference signal between the light having the first polarization direction and reflected by the reference surface and the light having the second polarization direction and reflected by the test surface, and detect, from the interference signal, a phase corresponding to an optical path length between the reference surface and the test surface;
a processing unit configured to perform processing of obtaining the absolute distance by controlling said phase detection unit so as to detect the phase corresponding to the optical path length between the reference surface and the test surface for each of the first reference wavelength and the second reference wavelength while changing the wavelength of light to be emitted by the first light source continuously from the first reference wavelength to the second reference wavelength by using said wavelength reference element;
a second light source configured to emit light having a third reference wavelength different from the first reference wavelength and the second reference wavelength,
wherein letting $\lambda_1$ be the first reference wavelength, $\lambda_2$ be the second reference wavelength, $\phi_1$ be the phase detected by said phase detection unit at the first reference wavelength, $\phi_2$ be the phase detected by said phase detection unit at the second reference wavelength, M be the number of phase jumps that occur when the wavelength of light to be emitted by the first light source is continuously changed from the first reference wavelength to the second reference wavelength, $\Lambda_{12}$ be a synthetic wavelength of the first reference wavelength and the second reference wavelength represented by $\lambda_1 \cdot \lambda_2 / |\lambda_1 - \lambda_2|$, $n_g$ be the group index detected by said refractive index detection unit, and k be the number of times the test surface reflects the light having the second polarization direction, said processing unit obtains the absolute distance $D_1$ by:

$$D_1 = \frac{1}{2k \cdot n_g}\left(M + \frac{\phi_2 - \phi_1}{2\pi}\right)\Lambda_{12},$$

wherein said polarizing beam splitter splits the light from the second light source into light having the first polarization direction and light having the second polarization direction, makes the light having the first polarization direction enter the reference surface, and makes the light having the second polarization direction enter the test surface,
wherein said processing unit controls said phase detection unit so as to detect the phase corresponding to the optical path length between the reference surface and the test surface for the third reference wavelength, wherein letting $\lambda_3$ be the third reference wavelength, $\phi_3$ be the phase detected by said phase detection unit at the third reference wavelength, $\Lambda_{13}$ be a synthetic wavelength of the first reference wavelength and the third reference wavelength represented by $\lambda_1 \cdot \lambda_3 / |\lambda_1 - \lambda_3|$, $d\lambda_3$ be an error from a designed value of the third reference wavelength, $d\Lambda_{12}$ be an error from a designed value of the synthetic wavelength of the first reference wavelength and the second reference wavelength, $d\Lambda_{13}$ be an error from a designed value of the synthetic wavelength of the first reference wavelength and the third reference wavelength, $d\phi$ be a detection error of said phase detection unit, and $n_3$ be a refractive index at $\lambda_3$, a range Dmax of the absolute distance measurable by the measuring apparatus satisfies:

$$\sqrt{2} \frac{d\phi}{2\pi} \frac{\Lambda_{13}}{\lambda_3} + \frac{2k \cdot D_{max}}{\lambda_3} \frac{d\Lambda_{13}}{\lambda_3} + \frac{2k \cdot D_{max}}{\lambda_3} \frac{d\lambda_3}{\lambda_3} < \frac{1}{2}; \text{ and}$$

$$\sqrt{2} \frac{d\phi}{2\pi} \frac{\Lambda_{12}}{\Lambda_{13}} + \frac{2k \cdot D_{max}}{\Lambda_{13}} \frac{d\Lambda_{12}}{\Lambda_{12}} + \frac{2k \cdot D_{max}}{\Lambda_{13}} \frac{d\Lambda_{13}}{\Lambda_{13}} < \frac{1}{2}, \text{ and}$$

wherein said processing unit obtains the absolute distance $D_3$ by:

$$D_3 = \frac{\lambda_3}{2k \cdot n_3} \left( \text{round}\left( \frac{\Lambda_{13}}{\lambda_3} \left( \text{round}\left( \frac{2k \cdot D_1}{\Lambda_{13}} - \frac{\phi_3 - \phi_1}{2\pi} \right) + \frac{\phi_3 - \phi_1}{2\pi} \right) - \frac{\phi_3}{2\pi} \right) + \frac{\phi_3}{2\pi} \right).$$

10. The apparatus according to claim 9, further comprising:
a shifter configured to shift a frequency of the light having the first polarization direction and reflected by the reference surface; and
a change unit configured to change the polarization direction of the light having the first polarization direction and having passed through said shifter,
wherein said phase detection unit includes a light amount detector configured to detect the interference signal between the light having the first polarization direction and reflected by the reference surface and the light having the second polarization direction and reflected by the test surface.

11. The apparatus according to claim 9, wherein said phase detection unit includes:
a phase difference adding unit configured to add a plurality of known phase differences to each of the light having the first polarization direction and the light of the second polarization direction; and
a plurality of light amount detectors each configured to detect an interference signal for the plurality of known phase differences added by said phase difference adding unit.

12. The apparatus according to claim 9, wherein said wavelength reference element includes a Fabry-Perot etalon.

13. The apparatus according to claim 9, wherein said wavelength reference element includes a gas cell having an absorption line at the known vacuum wavelength.

14. The apparatus according to claim 9, wherein said refractive index detection unit includes:
a thermometer configured to detect a temperature in the space between the reference surface and the test surface; and
a hygrometer configured to detect an atmospheric pressure in the space between the reference surface and the test surface.

15. The apparatus according to claim 9, wherein said refractive index detection unit includes:
a third light source configured to emit light having a wavelength different from the wavelength of the light from the first light source; and
a detection unit configured to detect, using the light from said third light source, an optical path difference between the reference surface and the test surface in the same optical path as that of the light from the first light source.

16. The apparatus according to claim 9, wherein said refractive index detection unit includes a detection unit configured to detect an interference signal corresponding to an optical path difference between a first optical path of vacuum atmosphere having a known length and a second optical path of atmosphere having the same length as that of the first optical path.

* * * * *